(12) United States Patent
Yang et al.

(10) Patent No.: US 11,652,582 B2
(45) Date of Patent: May 16, 2023

(54) ACKNOWLEDGMENT FEEDBACK TECHNIQUES IN SIDELINK WIRELESS COMMUNICATIONS

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/087,394

(22) Filed: Nov. 2, 2020

(65) Prior Publication Data

US 2021/0135797 A1 May 6, 2021

Related U.S. Application Data

(60) Provisional application No. 62/930,551, filed on Nov. 4, 2019.

(51) Int. Cl.
*H04W 72/04* (2009.01)
*H04L 1/1829* (2023.01)
*H04L 1/1867* (2023.01)

(52) U.S. Cl.
CPC .......... *H04L 1/1861* (2013.01); *H04L 1/1893* (2013.01); *H04W 72/04* (2013.01)

(58) Field of Classification Search
None
See application file for complete search history.

(56) References Cited

U.S. PATENT DOCUMENTS

2022/0271868 A1* 8/2022 Cheng ............... H04W 72/1263
2022/0279545 A1* 9/2022 Yoshioka ............. H04W 76/15

OTHER PUBLICATIONS

International Search Report and Written Opinion—PCT/US2020/058650—ISA/EPO—dated Apr. 30, 2021.
(Continued)

*Primary Examiner* — Willie J Daniel, Jr.
(74) *Attorney, Agent, or Firm* — Holland & Hart LLP

(57) ABSTRACT

Methods, systems, and devices for wireless communications are described for providing acknowledgment feedback in sidelink communications. A sidelink transmitting UE may receive a resource grant for a sidelink communication with one or more other UEs and may transmit the sidelink communication in accordance with the grant. The transmitting UE may then monitor for acknowledgment feedback from the one or more other UEs and generate sidelink acknowledgment feedback. A joint communication that provides both downlink acknowledgment feedback and the sidelink acknowledgment feedback may be provided to a serving base station. The transmitting UE may also multiplex sidelink acknowledgment feedback for each of two or more other UEs in a communication to the serving base station. The serving base station may determine whether any resources for retransmissions are to be granted based on the acknowledgment feedback.

22 Claims, 19 Drawing Sheets

(56) References Cited

OTHER PUBLICATIONS

VIVO: "Discussion on Mode 1 Resource Allocation Mechanism", 3GPP Draft, 3GPP TSG RAN WG1 Meeting #98bis, R1-1911419, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019 Oct. 13, 2019 (Oct. 13, 2019), XP051800859, 15 Pages, Retrieved from the Internet: URL:https://ftp.3gpp.org/Meetings_3GPP_SYNC/RAN1/Docs/R1-1911419.zip R1-1911419.DOC [retrieved on Oct. 13, 2019] p. 6-p. 7.

Huawei, et al., "Sidelink Resource Allocation Mode 1", 3GPP Draft, 3GPP TSG RAN WG1 Meeting #98bis, R1-1910055, 3rd Generation Partnership Project (3GPP), Mobile Competence Centre, 650, Route Des Lucioles, F-06921 Sophia-Anti Polis Cedex, France, vol. RAN WG1, No. Chongqing, China, Oct. 14, 2019-Oct. 20, 2019, Oct. 8, 2019 (Oct. 8, 2019), XP051809065, 19 Pages, Retrieved from the Internet: URL:https://ftp.3gpp.org/tsg_ran/WG1_RL1/TSGR1_98b/Docs/R1-1910055.zip, R1-1910055.docx [retrieved on Oct. 8, 2019] Paragraph [0003].

ITL: "Physical Layer Procedure for NR V2X", 3GPP Draft, 3GPP TSG RAN WG1 #98bis, R1-1910797_V2X_PHY_Procedure, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 7, 2019 (Oct. 7, 2019), XP051808976, 6 Pages, Retrieved from the Internet: URL:https://ftp.3gpp.org/tsg_ran/WG1_RL1/TSGR1_98b/Docs/R1-1910797.zip, R1-1910797_V2X_PHY procedure.docx [retrieved-on Oct. 7, 2019] p. 5-p. 6.

Partial International Search Report—PCT/US2020/058650—ISA/EPO—dated Feb. 8, 2021.

* cited by examiner

ACKNOWLEDGMENT FEEDBACK TECHNIQUES IN SIDELINK WIRELESS COMMUNICATIONS

CROSS REFERENCE

The present Application for Patent claims the benefit of U.S. Provisional Patent Application No. 62/930,551 by Yang et al., entitled "ACKNOWLEDGMENT FEEDBACK TECHNIQUES IN SIDELINK WIRELESS COMMUNICATIONS," filed Nov. 4, 2019, assigned to the assignee hereof, and expressly incorporated by reference herein.

BACKGROUND

The following relates generally to wireless communications, and more specifically to acknowledgment feedback techniques in sidelink wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support both access links and sidelinks. An access link is a communication link between a UE and a base station. In some examples, an access link may be referred to as a Uu interface. A sidelink is a communication link between similar devices. For example, a sidelink may support communications between multiple UEs or may support communications between multiple base stations. In some examples, an access link may be referred to as a PC5 interface (e.g., supporting vehicle-to-everything (V2X), vehicle-to-vehicle (V2V) communications between vehicles in a system, communications between base stations, etc.). In some cases, a sidelink may be referred to as a device-to-device (D2D) link and may support unicast messaging, multicast messaging, broadcast messaging, or combinations thereof. With the addition of one or more communications links at a wireless device, management of devices and communications between devices, including the reporting of acknowledgment feedback of different types of communications, may become challenging. Accordingly, efficient techniques for feedback reporting for sidelink and access link communications in such systems may be desirable.

SUMMARY

The described techniques relate to improved methods, systems, devices, and apparatuses that support acknowledgment feedback techniques in sidelink wireless communications. Various described techniques provide for multiplexing of acknowledgment feedback in sidelink communications. In some cases, a UE may receive a resource grant for a sidelink communication with one or more other UEs (e.g., for a sidelink groupcast communication), and the UE may transmit the sidelink communication in accordance with the grant. The UE may then monitor for acknowledgment feedback from the one or more other UEs, in order to determine whether the sidelink communication was successfully received at each of the one or more other UEs, and generate sidelink acknowledgment feedback. Further, the UE may receive a downlink grant for an access link downlink transmission, may receive the downlink transmission, and determine downlink acknowledgment feedback for the downlink transmission. In some cases, acknowledgment feedback resources for both the sidelink acknowledgment feedback and the downlink acknowledgment feedback may be common resources, and the UE may transmit a joint communication that provides both the downlink acknowledgment feedback and the sidelink acknowledgment feedback.

Additionally or alternatively, the UE may transmit the sidelink communication to two or more other UEs, and determine sidelink acknowledgment feedback from the two or more other UEs. The UE may then multiplex the sidelink acknowledgment feedback for each of the two or more other UEs in a communication to a serving base station. The base station may determine whether any resources for retransmissions are to be granted based on the acknowledgment feedback. In some cases, the UE may receive a sidelink configuration that indicates a number of other UEs and associated UE identifications, which may be used to generate an acknowledgment feedback codebook. In some cases, the sidelink configuration may be received from the base station, from an application layer, or combinations thereof.

A method of wireless communications is described. The method may include transmitting, from a UE, a sidelink communication to one or more other UEs, determining sidelink acknowledgment feedback for reception of the sidelink communication by the one or more other UEs, receiving a downlink communication from a base station, generating downlink acknowledgment feedback for reception of the downlink communication, and transmitting both the downlink acknowledgment feedback and the sidelink acknowledgment feedback to the base station via a joint transmission.

An apparatus for wireless communications is described. The apparatus may include a processor, memory coupled with the processor, and instructions stored in the memory. The instructions may be executable by the processor to cause the apparatus to transmit, from a UE, a sidelink communication to one or more other UEs, determine sidelink acknowledgment feedback for reception of the sidelink communication by the one or more other UEs, receive a downlink communication from a base station, generate downlink acknowledgment feedback for reception of the downlink communication, and transmit both the downlink acknowledgment feedback and the sidelink acknowledgment feedback to the base station via a joint transmission.

Another apparatus for wireless communications is described. The apparatus may include means for transmitting, from a UE, a sidelink communication to one or more other UEs, determining sidelink acknowledgment feedback for reception of the sidelink communication by the one or more other UEs, receiving a downlink communication from a base station, generating downlink acknowledgment feedback for reception of the downlink communication, and transmitting both the downlink acknowledgment feedback and the sidelink acknowledgment feedback to the base station via a joint transmission.

A non-transitory computer-readable medium storing code for wireless communications is described. The code may include instructions executable by a processor to transmit, from a UE, a sidelink communication to one or more other UEs, determine sidelink acknowledgment feedback for reception of the sidelink communication by the one or more other UEs, receive a downlink communication from a base station, generate downlink acknowledgment feedback for reception of the downlink communication, and transmit both the downlink acknowledgment feedback and the sidelink acknowledgment feedback to the base station via a joint transmission.

Some examples of the method, apparatuses, and non-transitory computer-readable medium described herein may further include operations, features, means, or instructions for identifying that an uplink transmission resource for the sidelink acknowledgment feedback corresponds to a same uplink transmission resource for the downlink acknowledgment feedback, and where the joint transmission is responsive to the identifying. In some examples of the method, apparatuses, and non-transitory computer-readable medium described herein, the joint transmission includes an acknowledgment feedback codebook for the downlink acknowledgment feedback and a sidelink acknowledgment feedback bit that is appended to the acknowledgment feedback codebook.

In some examples of the method, apparatuses, and non-transitory computer-readable medium described herein, the determining the sidelink acknowledgment feedback may include operations, features, means, or instructions for determining that at least a first UE of the one or more of the other UEs has successfully received the sidelink communication based on an absence of a negative acknowledgment from the first UE, and determining that at least a second UE of the one or more other UEs has not successfully received the sidelink communication based on receiving a negative acknowledgment from the second UE. Some examples of the method, apparatuses, and non-transitory computer-readable medium described herein may further include operations, features, means, or instructions for setting the sidelink acknowledgment feedback bit to indicate a negative acknowledgment based on the negative acknowledgment received from the second UE. Some examples of the method, apparatuses, and non-transitory computer-readable medium described herein may further include operations, features, means, or instructions for setting the sidelink acknowledgment feedback bit to indicate an acknowledgment of reception of the sidelink communication based on an absence of a negative acknowledgment being received from any of the one or more other UEs. In some examples of the method, apparatuses, and non-transitory computer-readable medium described herein, an uplink transmission resource for the joint transmission is determined based on a grant that scheduled the downlink communication from the base station.

A method of wireless communications is described. The method may include transmitting, from a UE, a sidelink communication to one or more other UEs, determining sidelink acknowledgment feedback for reception by each of the one or more other UEs of the sidelink communication, and multiplexing the sidelink acknowledgment feedback for each of the one or more other UEs in a communication to the base station.

An apparatus for wireless communications is described. The apparatus may include a processor, memory coupled with the processor, and instructions stored in the memory. The instructions may be executable by the processor to cause the apparatus to transmit, from a UE, a sidelink communication to one or more other UEs, determine sidelink acknowledgment feedback for reception by each of the one or more other UEs of the sidelink communication, and multiplex the sidelink acknowledgment feedback for each of the one or more other UEs in a communication to the base station.

Another apparatus for wireless communications is described. The apparatus may include means for transmitting, from a UE, a sidelink communication to one or more other UEs, determining sidelink acknowledgment feedback for reception by each of the one or more other UEs of the sidelink communication, and multiplexing the sidelink acknowledgment feedback for each of the one or more other UEs in a communication to the base station.

A non-transitory computer-readable medium storing code for wireless communications is described. The code may include instructions executable by a processor to transmit, from a UE, a sidelink communication to one or more other UEs, determine sidelink acknowledgment feedback for reception by each of the one or more other UEs of the sidelink communication, and multiplex the sidelink acknowledgment feedback for each of the one or more other UEs in a communication to the base station.

In some examples of the method, apparatuses, and non-transitory computer-readable medium described herein, the sidelink acknowledgment feedback includes an acknowledgment feedback codebook having a number of bits that is determined based on the number of the one or more other UEs that may be to receive the sidelink communication. Some examples of the method, apparatuses, and non-transitory computer-readable medium described herein may further include operations, features, means, or instructions for receiving a groupcast configuration that indicates each of the one or more other UEs that are to receive the sidelink communication. In some examples of the method, apparatuses, and non-transitory computer-readable medium described herein, the groupcast configuration includes a number of UEs and an identification of each of the number of UEs that are to receive the sidelink communication.

In some examples of the method, apparatuses, and non-transitory computer-readable medium described herein, the groupcast configuration further includes a sidelink acknowledgment feedback codebook that includes a number of bits corresponding to the number of UEs, and an order of each UE within the sidelink acknowledgment feedback codebook. In some examples of the method, apparatuses, and non-transitory computer-readable medium described herein, the groupcast configuration may be received in radio resource control signaling from a serving base station, or may be received from an application layer at the UE.

A method of wireless communications is described. The method may include transmitting, from a base station, a sidelink resource grant to a first UE for a sidelink communication to from the first UE to one or more other UEs, transmitting a downlink transmission to the first UE, and receiving both a downlink acknowledgment feedback for reception of the downlink communication and a sidelink acknowledgment feedback for reception of the sidelink communication via a joint transmission from the first UE.

An apparatus for wireless communications is described. The apparatus may include a processor, memory coupled with the processor, and instructions stored in the memory. The instructions may be executable by the processor to cause the apparatus to transmit, from a base station, a sidelink resource grant to a first UE for a sidelink communication to from the first UE to one or more other UEs, transmit a downlink transmission to the first UE, and receive both a downlink acknowledgment feedback for reception of the downlink communication and a sidelink acknowledgment feedback for reception of the sidelink communication via a joint transmission from the first UE.

Another apparatus for wireless communications is described. The apparatus may include means for transmitting, from a base station, a sidelink resource grant to a first UE for a sidelink communication to from the first UE to one or more other UEs, transmitting a downlink transmission to the first UE, and receiving both a downlink acknowledgment feedback for reception of the downlink communication and a sidelink acknowledgment feedback for reception of the sidelink communication via a joint transmission from the first UE.

A non-transitory computer-readable medium storing code for wireless communications is described. The code may include instructions executable by a processor to transmit, from a base station, a sidelink resource grant to a first UE for a sidelink communication to from the first UE to one or more other UEs, transmit a downlink transmission to the first UE, and receive both a downlink acknowledgment feedback for reception of the downlink communication and a sidelink acknowledgment feedback for reception of the sidelink communication via a joint transmission from the first UE.

Some examples of the method, apparatuses, and non-transitory computer-readable medium described herein may further include operations, features, means, or instructions for identifying that an uplink transmission resource for the sidelink acknowledgment feedback corresponds to a same uplink transmission resource for the downlink acknowledgment feedback or collides with the uplink transmission resource for the downlink acknowledgment feedback, and where the joint transmission is responsive to the identifying.

In some examples of the method, apparatuses, and non-transitory computer-readable medium described herein, the joint transmission includes an acknowledgment feedback codebook for the downlink acknowledgment feedback and a sidelink acknowledgment feedback bit that is appended to the acknowledgment feedback codebook. In some examples of the method, apparatuses, and non-transitory computer-readable medium described herein, an uplink transmission resource for the joint transmission may be determined based on the sidelink resource grant a downlink resource grant of the downlink transmission.

A method of wireless communications is described. The method may include transmitting, from a base station, a sidelink resource grant to a first UE for a sidelink communication to from the first UE to one or more other UEs, receiving acknowledgment feedback from the first UE that includes multiplexed sidelink acknowledgment feedback for reception of the sidelink communication at each of the one or more other UEs, and determining one or more further sidelink resource grants for retransmission of the sidelink communication based on the multiplexed sidelink acknowledgment feedback.

An apparatus for wireless communications is described. The apparatus may include a processor, memory coupled with the processor, and instructions stored in the memory. The instructions may be executable by the processor to cause the apparatus to transmit, from a base station, a sidelink resource grant to a first UE for a sidelink communication to from the first UE to one or more other UEs, receive acknowledgment feedback from the first UE that includes multiplexed sidelink acknowledgment feedback for reception of the sidelink communication at each of the one or more other UEs, and determine one or more further sidelink resource grants for retransmission of the sidelink communication based on the multiplexed sidelink acknowledgment feedback.

Another apparatus for wireless communications is described. The apparatus may include means for transmitting, from a base station, a sidelink resource grant to a first UE for a sidelink communication to from the first UE to one or more other UEs, receiving acknowledgment feedback from the first UE that includes multiplexed sidelink acknowledgment feedback for reception of the sidelink communication at each of the one or more other UEs, and determining one or more further sidelink resource grants for retransmission of the sidelink communication based on the multiplexed sidelink acknowledgment feedback.

A non-transitory computer-readable medium storing code for wireless communications is described. The code may include instructions executable by a processor to transmit, from a base station, a sidelink resource grant to a first UE for a sidelink communication to from the first UE to one or more other UEs, receive acknowledgment feedback from the first UE that includes multiplexed sidelink acknowledgment feedback for reception of the sidelink communication at each of the one or more other UEs, and determine one or more further sidelink resource grants for retransmission of the sidelink communication based on the multiplexed sidelink acknowledgment feedback.

In some examples of the method, apparatuses, and non-transitory computer-readable medium described herein, the sidelink acknowledgment feedback includes an acknowledgment feedback codebook having a number of bits that are determined based on the number of the one or more other UEs that are to receive the sidelink communication. Some examples of the method, apparatuses, and non-transitory computer-readable medium described herein may further include operations, features, means, or instructions for transmitting, to the first UE, a groupcast configuration that indicates each of the one or more other UEs that are to receive the sidelink communication. In some examples of the method, apparatuses, and non-transitory computer-readable medium described herein, the groupcast configuration includes a number of UEs and an identification of each of the number of UEs that are to receive the sidelink communication.

In some examples of the method, apparatuses, and non-transitory computer-readable medium described herein, the groupcast configuration further includes a sidelink acknowledgment feedback codebook that includes a number of bits corresponding to the number of UEs, and an order of each UE within the sidelink acknowledgment feedback codebook. In some examples of the method, apparatuses, and non-transitory computer-readable medium described herein, the groupcast configuration is transmitted to the first UE in radio resource control signaling.

DETAILED DESCRIPTION

Figure 1:
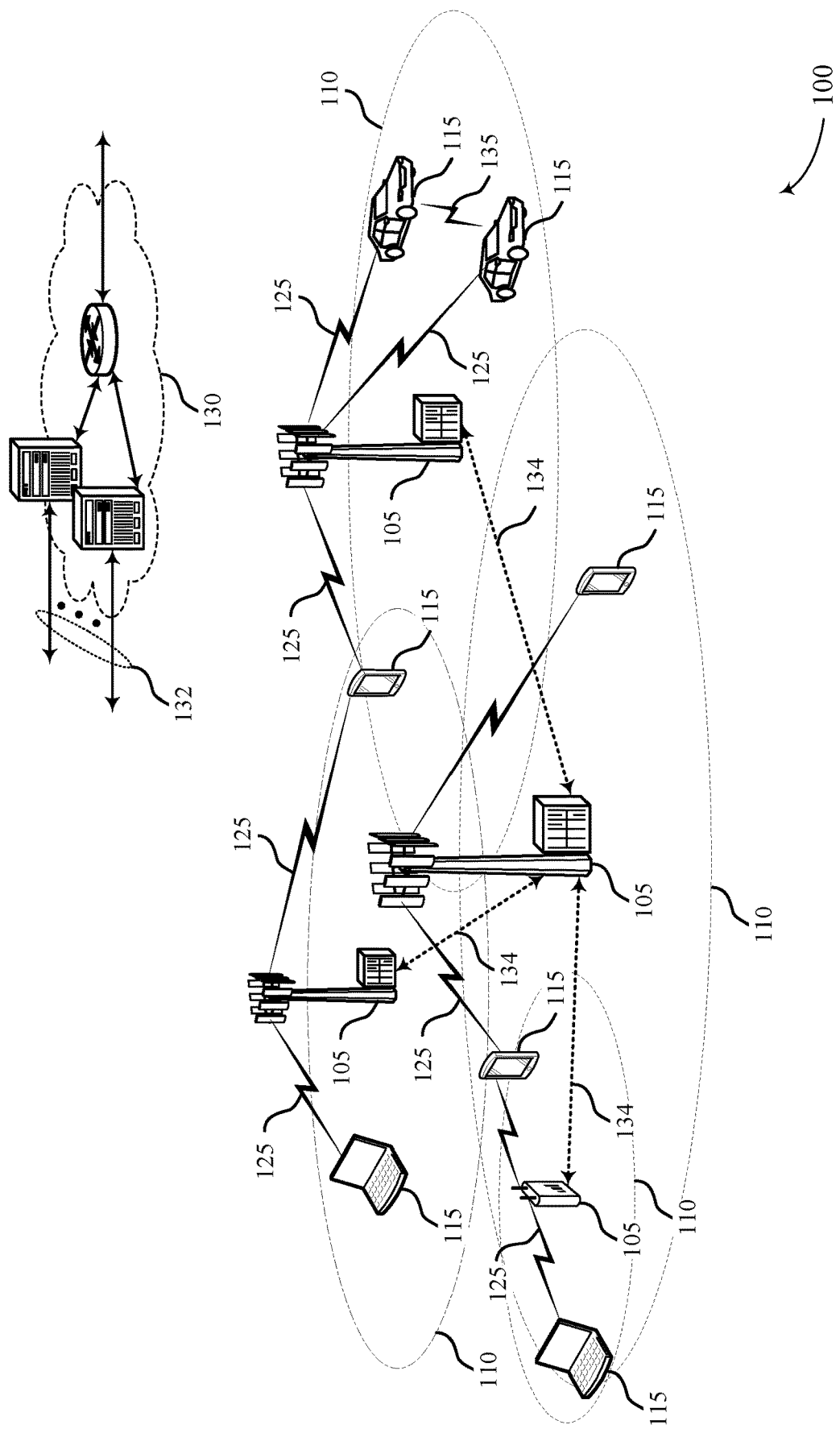
FIG. 1 illustrates an example of a system for wireless communications that supports acknowledgment feedback techniques in sidelink wireless communications in accordance with aspects of the present disclosure.

As discussed herein, a wireless communications system may support both access links and sidelinks for communications between wireless devices, in which an access link may refer to a communication link between a user equipment (UE) and a base station (e.g., a Uu interface), and a sidelink may refer to any communication link between similar wireless devices (e.g., a PC5 communication link between UEs, or a backhaul communication link between base stations). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. As demand for sidelink communication increases (e.g., due to increased V2X demand for autonomous and semi-autonomous vehicles, D2D communication between Internet-of-Things (IoT) devices, or the like), techniques to enhance throughput and reliability of sidelink channels is desirable.

In some deployments, which may be referred to as mode-1 deployments, a serving base station may control the resource allocation for the access link and sidelink. Thus, in order to provide a sidelink communication, a transmitting UE and one or more receiving UEs of the sidelink communications may receive an associated resource grant from the serving base station (e.g., in a downlink control information (DCI) transmission via an access link of each of the sidelink UEs). Further, in the event that a sidelink communication is not successfully received at a receiving UE, resources for a retransmission of the sidelink communication may be provided by the serving base station. In other deployments, which may be referred to as mode-2 deployments, a sidelink UE may itself select control and data resources from one or more resource pools that are configured for sidelink communications.

Techniques such as discussed in various aspects of the present disclosure provide for sidelink communications in which acknowledgment feedback may be provided to a serving base station in mode-1 deployments. In some cases, a UE may receive a resource grant for a sidelink communication with one or more other UEs (e.g., for a sidelink groupcast communication), and the UE may transmit the sidelink communication in accordance with the grant. The UE may then monitor for acknowledgment feedback from the one or more other UEs, in order to determine whether the sidelink communication was successfully received at each of the one or more other UEs, and generate sidelink acknowledgment feedback. Further, in some cases the UE may receive a downlink grant for an access link downlink transmission, may receive the downlink transmission, and determine downlink acknowledgment feedback for the downlink transmission. In some cases, acknowledgment feedback resources for both the sidelink acknowledgment feedback and the downlink acknowledgment feedback may collide such that both downlink acknowledgment feedback and sidelink acknowledgment feedback are to be provided using the same uplink resources. In such cases, in accordance with various aspects discussed herein, the UE may transmit a joint communication that provides both the downlink acknowledgment feedback and the sidelink acknowledgment feedback.

Additionally or alternatively, the UE may transmit the sidelink communication to two or more other UEs, and determine sidelink acknowledgment feedback from the two or more other UEs. The UE may then multiplex the sidelink acknowledgment feedback for each of the two or more other UEs in a communication to a serving base station. The base station may determine whether any resources for retransmissions are to be granted based on the acknowledgment feedback. In some cases, the UE may receive a sidelink configuration that indicates a number of other UEs and associated UE identifications, which may be used to generate an acknowledgment feedback codebook. In some cases, the sidelink configuration may be received from the base station. In some cases, a higher layer, such as an application layer at the UE or a mid-ware layer at the UE, may provide the sidelink configuration (e.g., a UE member ID of each UE in a sidelink groupcast group, an acknowledgment feedback codebook configuration and mapping of UE member IDs to feedback codebook bit locations, and the like).

Techniques such as discussed herein thus provide for enhanced reliability and efficiency in providing acknowledgment feedback in sidelink communications. For example, by providing efficient feedback, resources for one or more retransmissions may be efficiently granted to help reduce latency of retransmissions. Further, efficient determination of feedback resources may be provided, which can reduce signaling and overhead associated with sidelink groupcast configuration.

Aspects of the disclosure are initially described in the context of a wireless communications system. Examples of sidelink communications systems and resources are then discussed. Aspects of the disclosure are further illustrated by and described with reference to apparatus diagrams, system diagrams, and flowcharts that relate to acknowledgment feedback techniques in sidelink wireless communications.

FIG. 1 illustrates an example of a wireless communications system 100 that supports acknowledgment feedback techniques in sidelink wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 via a sidelink connection 135 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group (e.g., in a connection-based multicast configuration). In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, when two or more UEs 115 of wireless communications system 100 establish a sidelink connection 135 in a mode-1 sidelink deployment, a transmitting UE 115 may receive a resource grant for a sidelink communication with one or more other UEs 115 and may transmit the sidelink communication in accordance with the grant. The transmitting UE 115 may then monitor for acknowledgment feedback from the one or more other UEs and generate sidelink acknowledgment feedback. Further, the transmitting UE 115 may receive a downlink grant for an access link downlink transmission, and determine downlink acknowledgment feedback for the downlink transmission. In some cases, a joint communication that provides both the downlink acknowledgment feedback and the sidelink acknowledgment feedback may be provided to a serving base station 105.

In other cases, the transmitting UE 115 may transmit the sidelink communication to two or more other UEs, and determine sidelink acknowledgment feedback of the two or more other UEs 115. The transmitting UE 115 may then multiplex the sidelink acknowledgment feedback for each of the two or more other UEs 115 in a communication to the serving base station 105. The serving base station 105 may determine whether any resources for retransmissions are to be granted based on the acknowledgment feedback.

Figure 2:
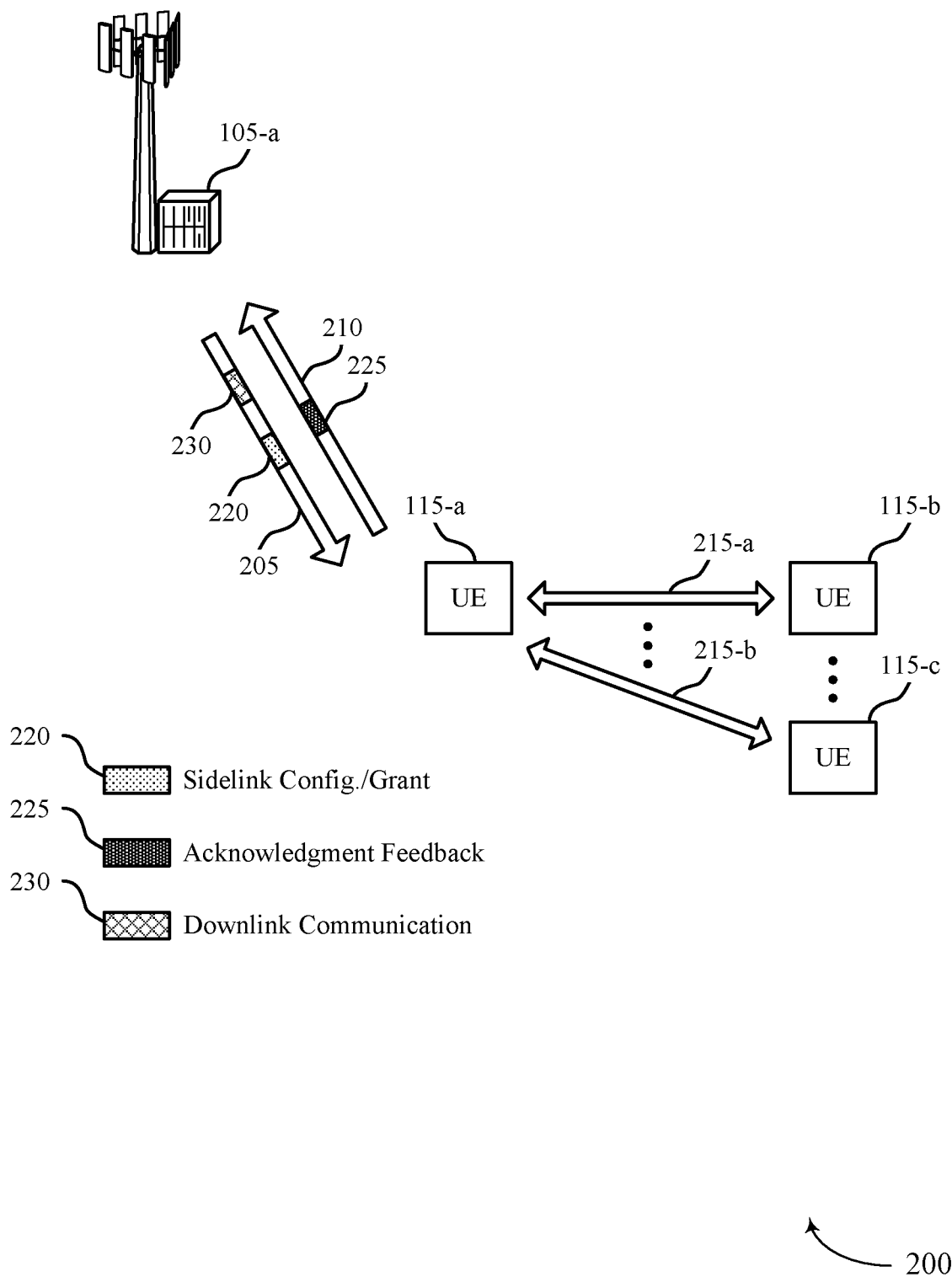
FIG. 2 illustrates an example of a sidelink communications system that supports acknowledgment feedback techniques in sidelink wireless communications in accordance with aspects of the present disclosure.

FIG. 2 illustrates an example of a sidelink communications system 200 that supports acknowledgment feedback techniques in sidelink wireless communications in accordance with aspects of the present disclosure. In some examples, sidelink communications system 200 may implement aspects of wireless communications system 100.

In some examples, the sidelink communications system 200 may include a first UE 115-a, a second UE 115-b, a third UE 115-c, and base station 105-a which may be examples of UEs 115 and base stations 105 described with reference to FIG. 1. One or more of the UEs 115 may communicate with the base station 105 using a corresponding access link.

In this example, the first UE 115-a, second UE 115-b, and third UE 115-c may be members of a sidelink groupcast communications group, in which members of the group may communicate with other members of the group to provide data or other information via sidelinks 215 (e.g., sidelinks 215a and 215b). In some cases, the first UE 115-a may be a transmitting UE in a sidelink communications group. It is noted that the illustrated sidelink groupcast communications group provides communications between three UEs 115, which are illustrated in wireless communications system 200 for the sake of brevity, and the techniques described below may be applicable to other numbers of one or more UEs 115 within a system that may establish sidelink communications. Further, sidelink communication techniques may be used for device-to-device communication of wireless devices other than UEs, such as base station communications (e.g., wireless backhaul links between base stations or TRPs, etc.), communications between access points, and the like.

In the example of FIG. 2, the base station 105-a may transmit downlink communications to one or more of the UEs 115 using a downlink channel 205 and receive uplink communications from one or more of the UEs 115 using an uplink channel 210. The UEs 115 may establish sidelinks 215 for sidelink communications. In this example, the base station 105-a and UEs 115 may use mode-1 sidelink communications, and the base station 105-a may provide sidelink configuration and grant information 220 for the sidelink communications. Further, the first UE 115-a may be a transmitting UE, and may monitor for acknowledgment feedback from the second UE 115-b and third UE 115-c after a sidelink communication (e.g., on a physical sidelink feedback channel (PSFCH)). In some cases, the second UE 115-b and third UE 115-c may transmit acknowledgment feedback only if they did not successfully receive the sidelink communication (e.g., transmit a negative acknowledgment (NACK) only). Thus, if the first UE 115-a does not receive a NACK, it is assumed that the sidelink communication was successfully received. The first UE 115-a may transmit acknowledgment feedback 225 to the base station 105-a using the uplink channel 210.

In some cases, in addition to sidelink acknowledgment feedback, the first UE 115-a may also transmit downlink acknowledgment feedback (e.g., hybrid acknowledgment repeat request (HARQ) positive acknowledgment (ACK) or NACK feedback) for access link downlink transmissions 230. Further, in some cases, uplink resources for the acknowledgment feedback 225 may be separately configured for sidelink communications and access link communications, which may in some cases result in a collision between sidelink acknowledgment feedback and downlink acknowledgment feedback (e.g., when the physical uplink control channel (PUCCH) resource for downlink HARQ-ACK collides with a PUCCH resource for sidelink HARQ-ACK). Such a collision is resolved in accordance with various aspects by the first UE 115-a appending the sidelink acknowledgment feedback to the downlink acknowledgment feedback to provide a joint transmission of the sidelink acknowledgment feedback and the downlink acknowledgment feedback.

For example, the first UE 115-a may generate a one-bit indicator for the sidelink acknowledgment feedback, and concatenate/append the bit to the downlink acknowledgment feedback codebook. In cases where the first UE 115-a does not receive any NACK for the sidelink communication, indicating successful reception at each receiving UE 115, UE 115-a generates an ACK for the sidelink acknowledgment feedback which is appended to the downlink acknowledgment feedback codebook. Likewise, if the first UE 115-a receives one or more NACKs for the sidelink communications, UE 115-a generates a NACK for the sidelink acknowledgment feedback which is appended to the downlink acknowledgment feedback codebook. Such techniques provide that there is no mis-alignment on the codebook size between the base station 105-a and the first UE 115-a. In some cases, the combined acknowledgment feedback may be transmitted using an indication in the downlink grant associated with the access link downlink transmission to determine the uplink resource for the combined acknowledgment feedback (e.g., the PUCCH resource indicator in the downlink DL grant for PDSCH). Such an uplink resource selection may be beneficial because there may be a larger gap in time between DCI for sidelink and the sidelink acknowledgment feedback than for the access link.

In other cases, the first UE 115-a may multicast a packet to a group of receiving UEs 115 (e.g., to the second UE 115-b, the third UE 115-c, or one or more other UEs 115), and each receiving UE 115 in the group will separately provide a NACK if it does not receive the packet correctly. The receiving UEs 115 may or may not provide an ACK if it has received the packet correctly. In certain applications, the base station 105-a may need to know which UEs 115 correctly received the sidelink communications packet, and which failed the reception. In some cases, the first UE 115-a may multiplex the sidelink acknowledgment feedback and transmit the multiplexed acknowledgment feedback to the base station 105-a. In such cases, the number of bits that the first UE 115-a transmits in the multiplexed acknowledgment feedback may be determined by the number of UEs 115 in the group, and this information may be known at both the base station 105-a and the first UE 115-a, including the ID of the UEs 115 in the group. For example, for each sidelink receiving UE 115 whose corresponding acknowledgment feedback is not received by the first UE 115-a, an ACK indication may be provided in the corresponding position that is mapped to the associated receiving UE 115 in the acknowledgment feedback codebook, so that the base station 105-a knows which UE 115 sent a NACK and which ones did not. In some cases, the multiplexed acknowledgment feedback codebook may be semi-statically configured by the base station 105-a, or could be indicated by application layer or higher layer, to provide the UE IDs of the group, and a mapping of each UE ID to a bit position in the acknowledgment feedback codebook.

Figure 3:
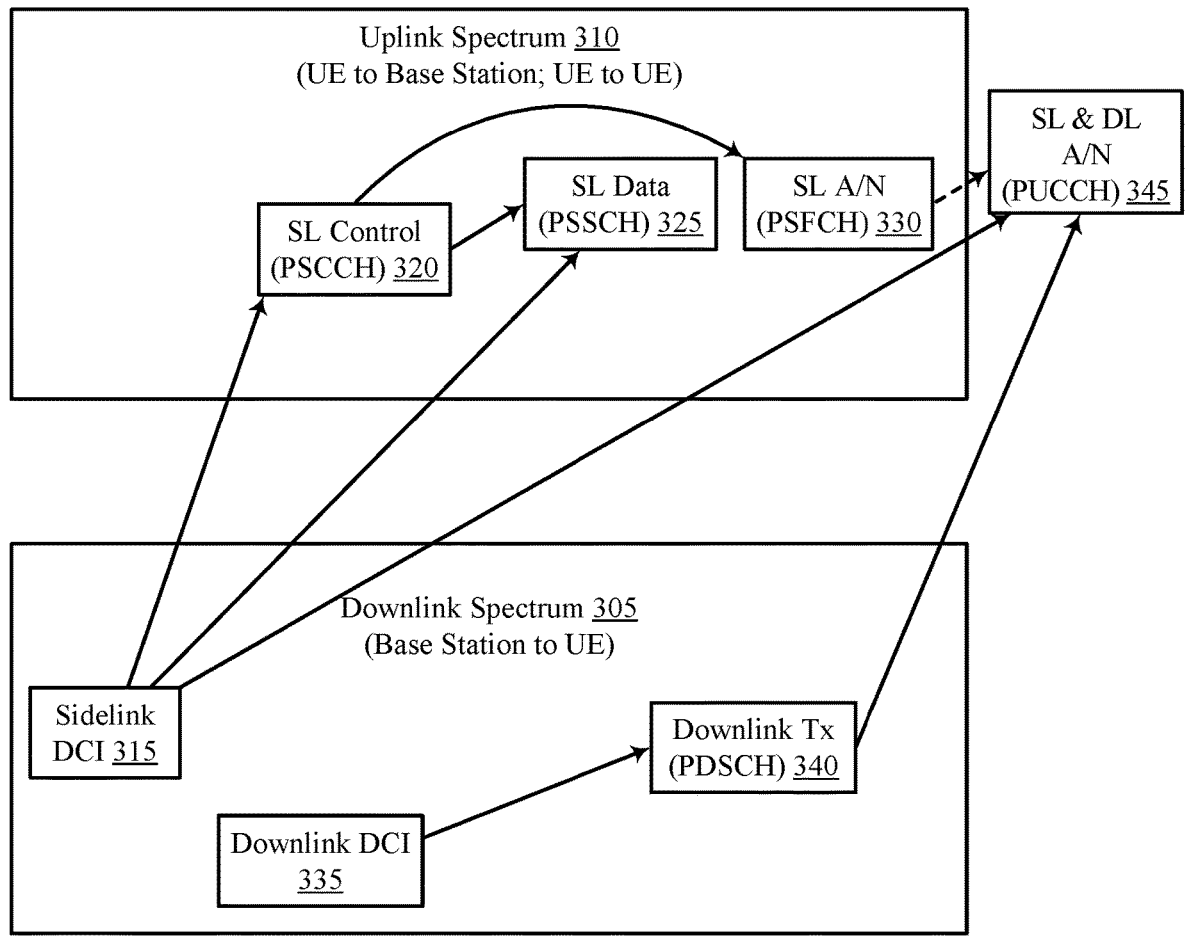
FIG. 3 illustrates an example of wireless resources that support acknowledgment feedback techniques in sidelink wireless communications in accordance with aspects of the present disclosure.

FIG. 3 illustrates an example of wireless resources 300 that supports acknowledgment feedback techniques in sidelink wireless communications in accordance with aspects of the present disclosure. In some examples, wireless resources 300 may implement aspects of wireless communications system 100 or 200. In this example, downlink spectrum 305 may include resources for downlink transmissions from a serving base station to one or more UEs. Further, uplink spectrum 310 may include resources for uplink communications from the one or more UEs, as well as sidelink resources for sidelink communications.

In this example, a serving base station may transmit a sidelink DCI 315 to a transmitting sidelink UE. The sidelink DCI 315 may indicate resources for a sidelink control channel 320 (e.g., a physical sidelink control channel (PSCCH)), resources for a sidelink data channel 325 (e.g., a physical sidelink shared channel (PSSCH)), as well as uplink resources for a joint sidelink and downlink acknowledgment feedback transmission 345 (e.g., on PUCCH resources). In some cases, such as discussed herein, the transmitting sidelink UE may monitor for sidelink acknowledgment feedback 330 (e.g., on PSFCH), which may be indicated by the sidelink control channel 320. The transmitting sidelink UE may forward the associated sidelink feedback to the base station in a joint transmission, in some cases, with acknowledgment feedback for a downlink transmission 340 that is separately scheduled by a downlink grant in downlink DCI 335 to the transmitting UE.

Figure 4:
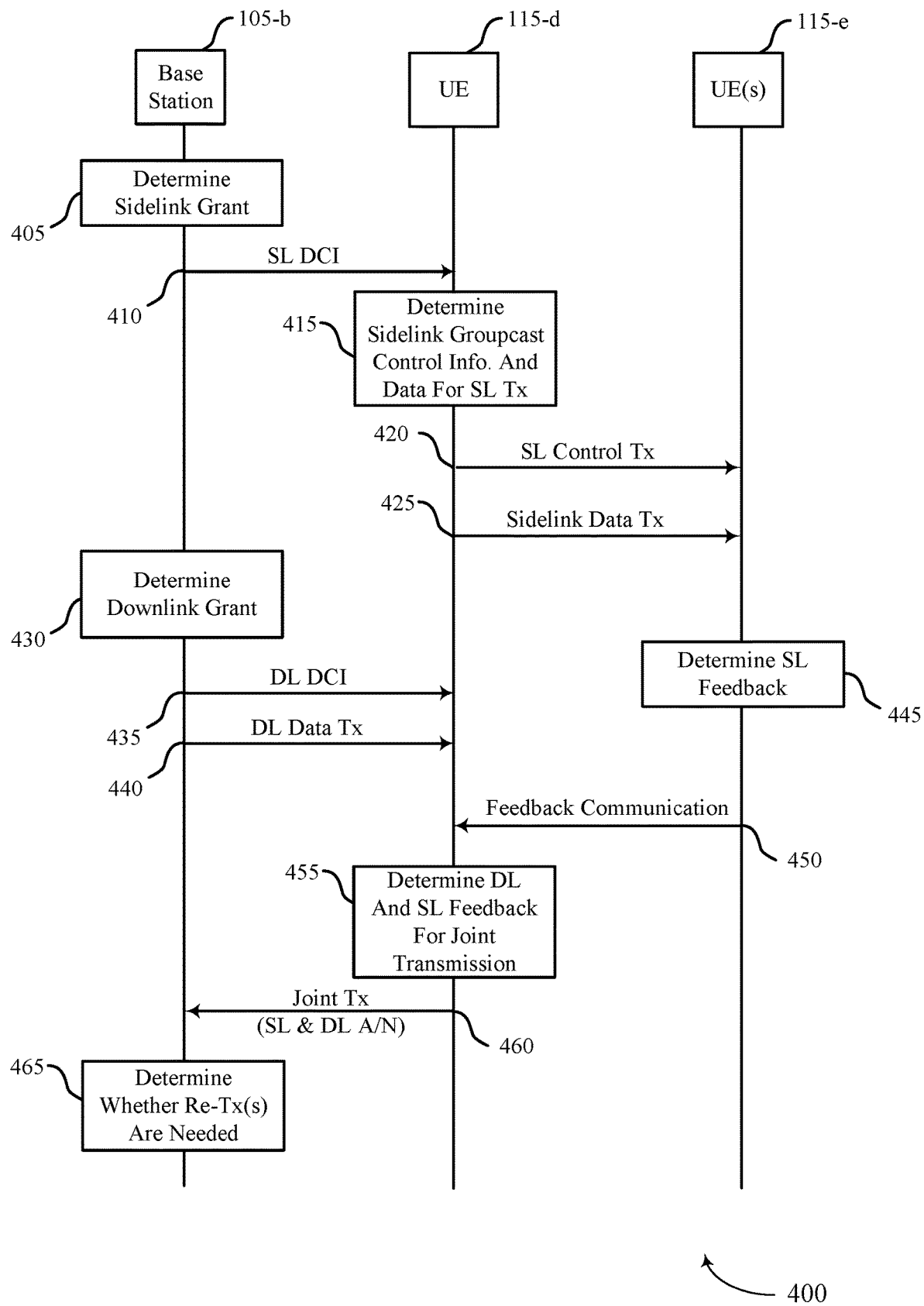
FIG. 4 illustrates an example of a process flow that supports acknowledgment feedback techniques in sidelink wireless communications in accordance with aspects of the present disclosure.

FIG. 4 illustrates an example of a process flow 400 that supports acknowledgment feedback techniques in sidelink wireless communications in accordance with aspects of the present disclosure. In some examples, process flow 400 may implement aspects of wireless communications system 100 or 200. Process flow 400 may be implemented by first UE 115-d, second UE or UEs 115-e, or any other examples of UEs 115, and base station 105-b, as described herein. Alternative examples of the following may be implemented, where some steps are performed in a different order than described or are not performed at all. In some cases, steps may include additional features not mentioned below, or further steps may be added.

At 405, the base station 105-b may determine a sidelink grant. In some cases, the UEs 115 and base station 105-b may operate in mode-1 sidelink communications, where the base station 105-b may provide grants for sidelink communications. At 410, the base station may transmit a sidelink DCI to the first UE 115-d that indicates the resources for sidelink communications, and that may also indicate an uplink resource for sidelink acknowledgment feedback.

At 415, the first UE 115-d may receive the sidelink groupcast control information and identify data for transmission in a sidelink communication. In some cases, the first UE 115-f may be a group leader for sidelink groupcast communications (e.g., a platoon leader in V2X sidelink communications), and may transmit various sidelink communications associated with the sidelink group. At 420, the first UE 115-*d* may transmit sidelink control information (e.g., via PSCCH), followed at 425 by a sidelink data transmission.

At 430, the base station 105-*b* may determine a downlink grant for an access link downlink transmission to the first UE 115-*d*. At 435, the base station 105-*b* may transmit downlink DCI to the first UE 115-*d*, followed at 440 by the corresponding downlink data transmission. In some cases, the downlink DCI may indicate uplink resources for a corresponding acknowledgment feedback transmission that collide with uplink resources for reporting the sidelink acknowledgment feedback.

At 445, the second UE 115-*e* may determine sidelink feedback, which may be transmitted at 450 in a feedback communication to the first UE 115-*d*. In some cases, feedback communication may only be transmitted in the event of a NACK at the second UE 115-*e*.

At 455, the first UE 115-*d* may determine the downlink and sidelink feedback for a joint transmission to the base station 105-*b*. At 460, the first UE 115-*d* may transmit the joint transmission to the base station 105-*b*. At 465, the base station 105-*b* may determine whether any retransmissions are needed, and allocate sidelink resources for such retransmissions in accordance with the determination.

Figure 5:
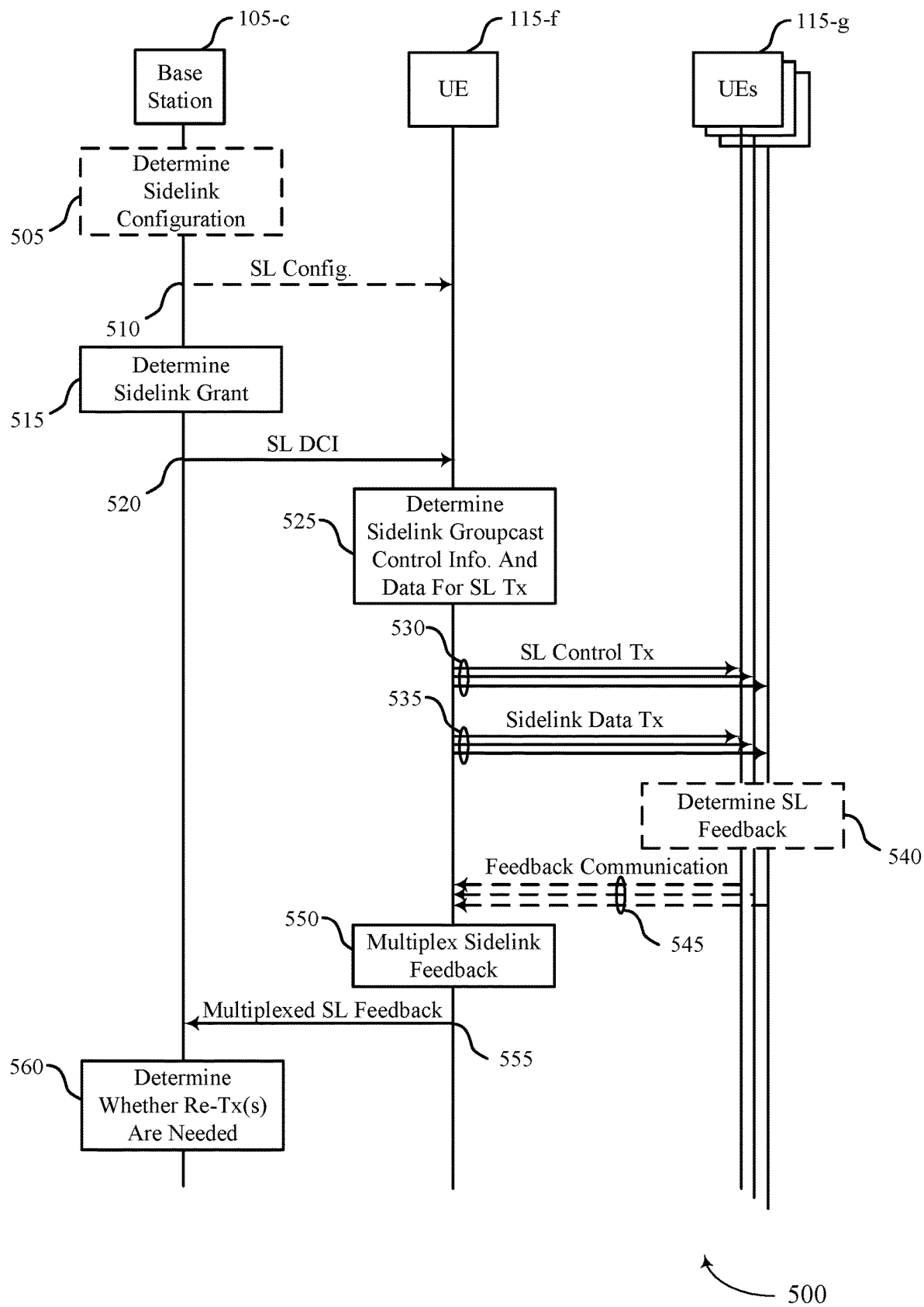
FIG. 5 illustrates an example of a process flow that supports acknowledgment feedback techniques in sidelink wireless communications in accordance with aspects of the present disclosure.

FIG. 5 illustrates an example of a process flow 500 that supports acknowledgment feedback techniques in sidelink wireless communications in accordance with aspects of the present disclosure. In some examples, process flow 500 may implement aspects of wireless communications system 100 or 200. Process flow 500 may be implemented by first UE 115-*f*, one or more other UEs 115-*g*, and base station 105-*c*, as described herein. Alternative examples of the following may be implemented, where some steps are performed in a different order than described or are not performed at all. In some cases, steps may include additional features not mentioned below, or further steps may be added.

Optionally, at 505, the base station 105-*c* may determine a sidelink configuration for a sidelink group of UEs 115. In some cases, the UEs 115 and base station 105-*c* may operate in mode-1 sidelink communications, where the base station 105-*c* may provide grants for sidelink communications. At 510, the base station may optionally transmit a sidelink configuration to the first UE 115-*f* that indicates the group information for the sidelink communications. In other cases, an application at a higher layer may provide group information for sidelink communications.

At 515, the base station may determine a sidelink grant for the group of UEs. At 520, the base station 105-*c* may transmit the sidelink grant to the first UE 115-*f* in a sidelink DCI transmission.

At 525, the first UE 115-*f* may determine sidelink groupcast control information and data for sidelink communications. Based on the determined sidelink groupcast control information and data, the first UE 115-*f* may transmit, at 530, sidelink control transmissions to the one or more other UEs 115-*g*. The first UE 115-*f* may then transmit, at 535, a multicast sidelink data communication to the one or more other UEs 115-*g*.

At 540, each of the one or more other UEs 115-*g* may, in some cases, determine sidelink feedback for the sidelink data communication. In some cases, the UEs 115-*g* may determine the sidelink feedback when the sidelink data is not properly decoded, to indicate a NACK, but may not generate acknowledgment feedback if the sidelink data is properly decoded. In other cases, the other UEs 115-*g* may generate an ACK or a NACK for the sidelink data. At 545, in cases where a feedback is generated, one or more of the other UEs 115-*g* may transmit a feedback communication to the first UE 115-*f*.

At 550, based on the received feedback communications from the one or more other UEs 115-*g*, the first UE 115-*f* may multiplex sidelink feedback. In some cases, the multiplexing may be based on the sidelink configuration, which may provide a number of other UEs, UE IDs of the other UEs, and a mapping of each of the other UEs 115-*g* into a sidelink acknowledgment feedback codebook. At 555, the first UE 115-*f* may transmit the multiplexed sidelink feedback to the base station 105-*c*. The base station 105-*c* may determine whether any retransmissions are needed, and allocate sidelink resources for such retransmissions in accordance with the determination.

Figure 6:
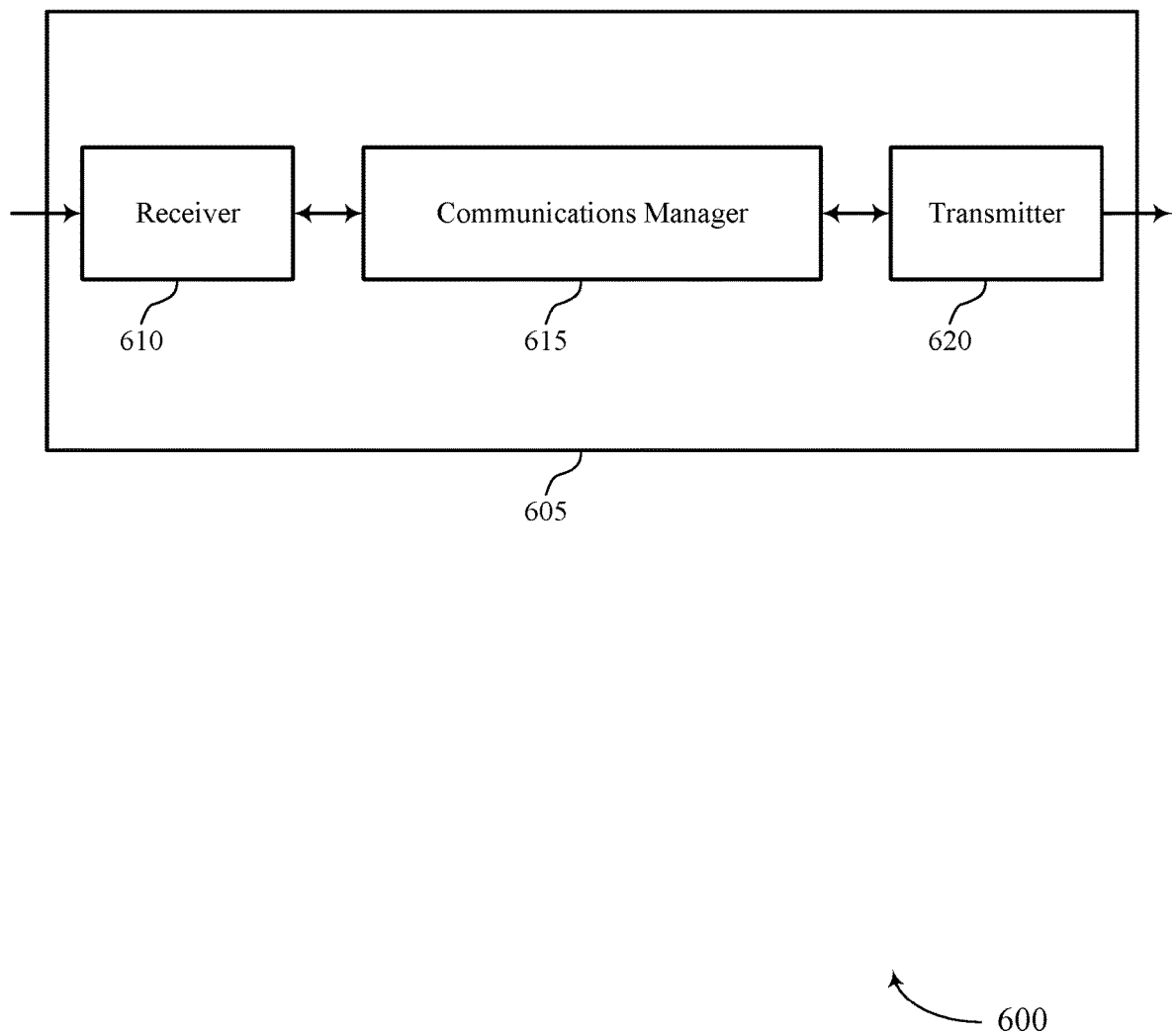
FIGS. 6 and 7 show block diagrams of devices that support acknowledgment feedback techniques in sidelink wireless communications in accordance with aspects of the present disclosure.

FIG. 6 shows a block diagram 600 of a device 605 that supports acknowledgment feedback techniques in sidelink wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to acknowledgment feedback techniques in sidelink wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit, from a UE, a sidelink communication to one or more other UEs, determine sidelink acknowledgment feedback for reception of the sidelink communication by the one or more other UEs, receive a downlink communication from a base station, generate downlink acknowledgment feedback for reception of the downlink communication, and transmit both the downlink acknowledgment feedback and the sidelink acknowledgment feedback to the base station via a joint transmission.

The communications manager 615 may also transmit, from a UE, a sidelink communication to one or more other UEs, determine sidelink acknowledgment feedback for reception by each of the one or more other UEs of the sidelink communication, and multiplex the sidelink acknowledgment feedback for each of the one or more other UEs in a communication to the base station. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may provide for enhanced throughput and reliability of sidelink communication channels. For example, the device 605 may transmit downlink acknowledgment feedback and sidelink acknowledgment feedback in a joint communication. The joint communication may reduce potential for collisions between sidelink and downlink feedback, thereby improving the reliability and throughout associated with sidelink communications. Additionally or alternatively, the device 605 may communicate with a base station to efficiently determine feedback resources, which may reduce signaling and overhead associated with a sidelink groupcast configuration.

Based on the efficient determination of feedback resources, a processor of the device 605 (e.g., a processor controlling the receiver 610, the communications manager 615, the transmitter 620, etc.) may reduce processing delays, reduce processing resources used for communications, or both. For example, by transmitting sidelink acknowledgment feedback and downlink acknowledgment feedback in a joint communication, the processor may use fewer resources for transmitting feedback than if the processor transmits the sidelink and downlink feedback separately.

Figure 7:
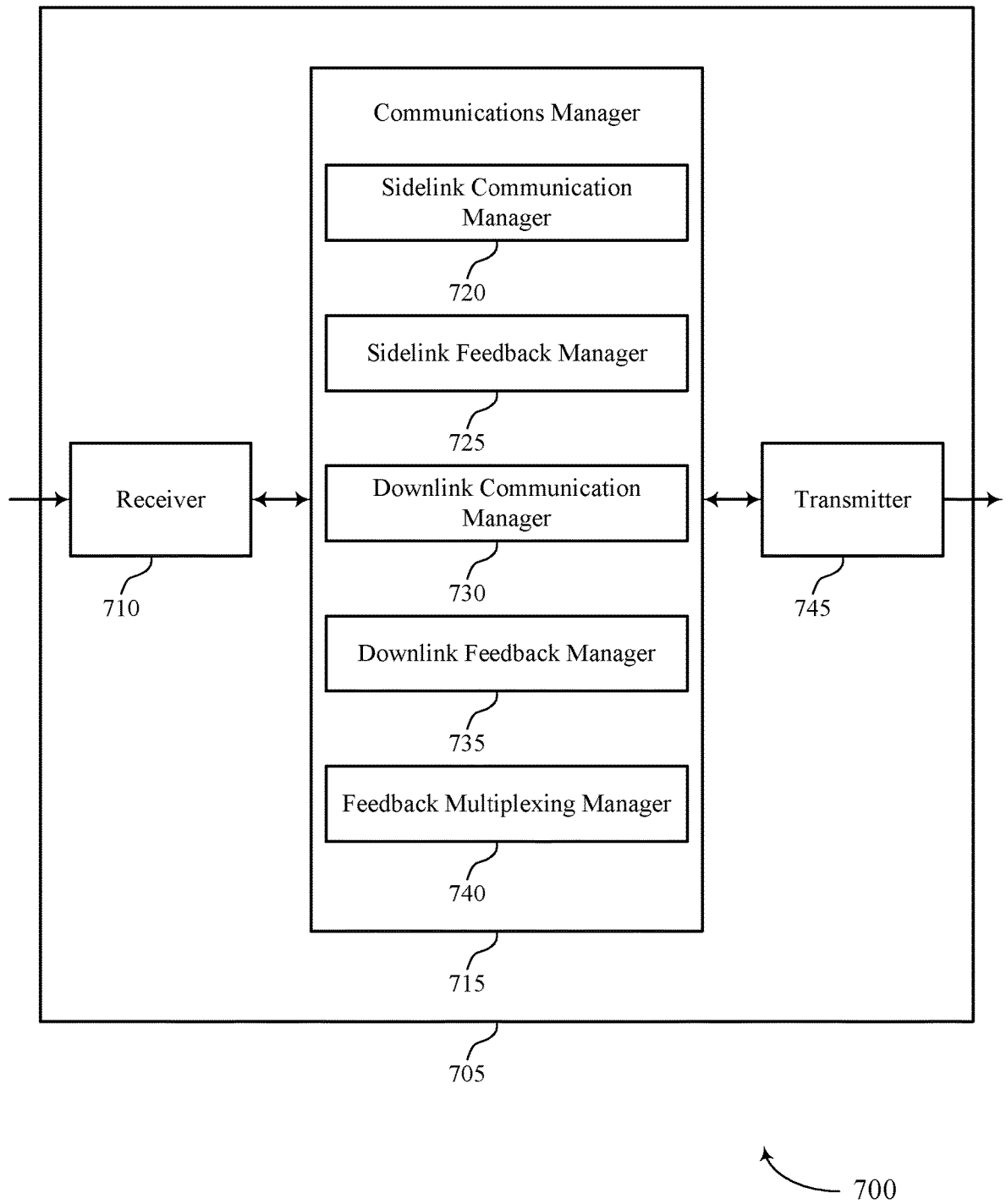

FIG. 7 shows a block diagram 700 of a device 705 that supports acknowledgment feedback techniques in sidelink wireless communications in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to acknowledgment feedback techniques in sidelink wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a sidelink communication manager 720, a sidelink feedback manager 725, a downlink communication manager 730, a downlink feedback manager 735, and a feedback multiplexing manager 740. The communications manager 715 may be an example of aspects of the communications manager 910 described herein.

The sidelink communication manager 720 may transmit, from a UE, a sidelink communication to one or more other UEs. The sidelink feedback manager 725 may determine sidelink acknowledgment feedback for reception of the sidelink communication by the one or more other UEs. The downlink communication manager 730 may receive a downlink communication from a base station. The downlink feedback manager 735 may generate downlink acknowledgment feedback for reception of the downlink communication. The feedback multiplexing manager 740 may transmit both the downlink acknowledgment feedback and the sidelink acknowledgment feedback to the base station via a joint transmission.

In some cases, the sidelink communication manager 720 may transmit, from a UE, a sidelink communication to one or more other UEs. The sidelink feedback manager 725 may determine sidelink acknowledgment feedback for reception by each of the one or more other UEs of the sidelink communication. The feedback multiplexing manager 740 may multiplex the sidelink acknowledgment feedback for each of the one or more other UEs in a communication to the base station.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
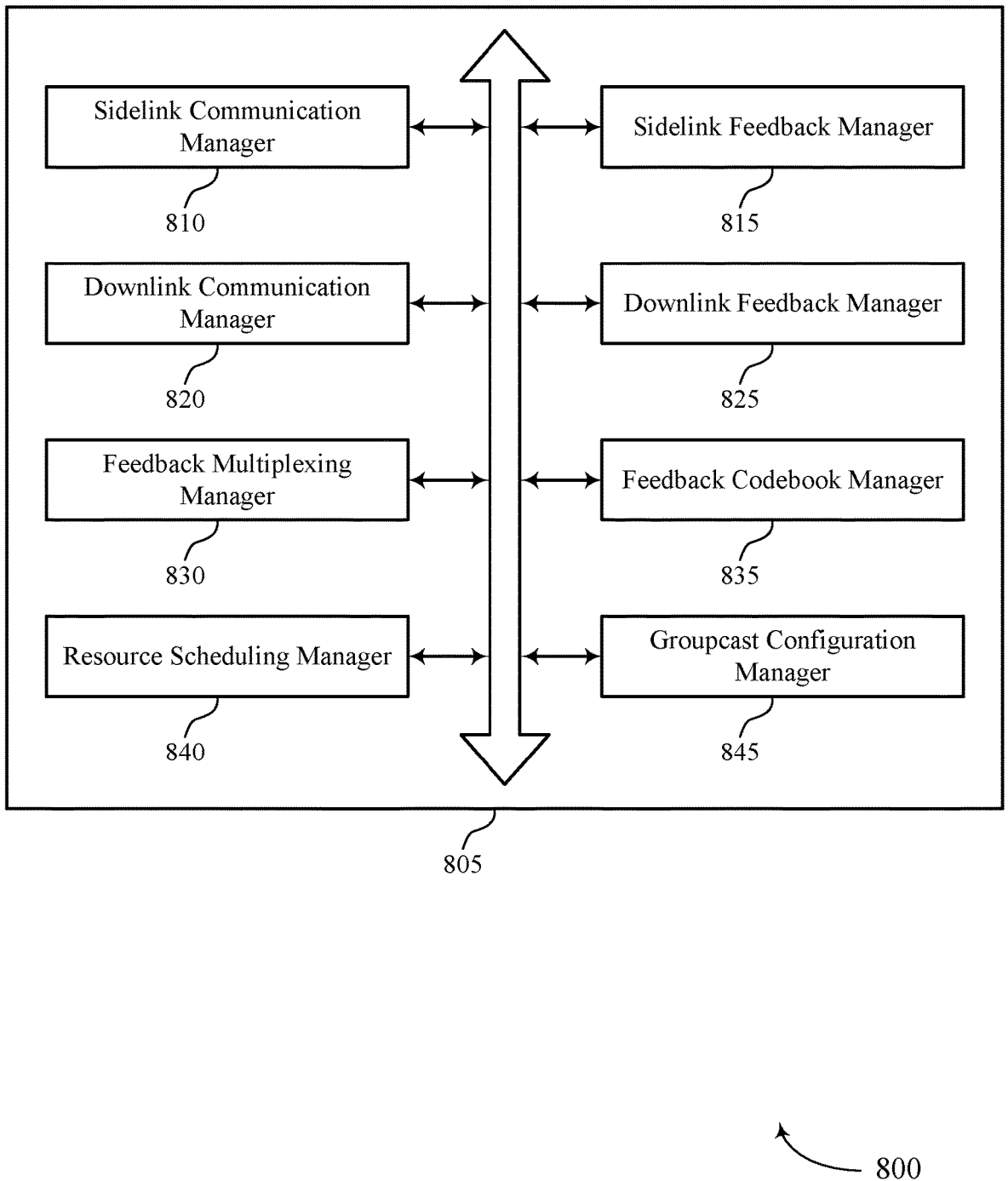
FIG. 8 shows a block diagram of a communications manager that supports acknowledgment feedback techniques in sidelink wireless communications in accordance with aspects of the present disclosure.

FIG. 8 shows a block diagram 800 of a communications manager 805 that supports acknowledgment feedback techniques in sidelink wireless communications in accordance with aspects of the present disclosure. The communications manager 805 may be an example of aspects of a communications manager 615, a communications manager 715, or a communications manager 910 described herein. The communications manager 805 may include a sidelink communication manager 810, a sidelink feedback manager 815, a downlink communication manager 820, a downlink feedback manager 825, a feedback multiplexing manager 830, a feedback codebook manager 835, a resource scheduling manager 840, and a groupcast configuration manager 845. Each of these modules may communicate, directly or indirectly, with one another (e.g., via one or more buses).

The sidelink communication manager 810 may transmit, from a UE, a sidelink communication to one or more other UEs.

The sidelink feedback manager 815 may determine sidelink acknowledgment feedback for reception of the sidelink communication by the one or more other UEs. In some examples, the sidelink feedback manager 815 may determine sidelink acknowledgment feedback for reception by each of the one or more other UEs of the sidelink communication.

In some examples, the sidelink feedback manager 815 may determine that at least a first UE of the one or more of the other UEs has successfully received the sidelink communication based on an absence of a negative acknowledgment from the first UE. In some examples, the sidelink feedback manager 815 may determine that at least a second UE of the one or more other UEs has not successfully received the sidelink communication based on receiving a negative acknowledgment from the second UE.

In some examples, the sidelink feedback manager 815 may set the sidelink acknowledgment feedback bit to indicate a negative acknowledgment based on the negative acknowledgment received from the second UE.

The downlink communication manager 820 may receive a downlink communication from a base station. The downlink feedback manager 825 may generate downlink acknowledgment feedback for reception of the downlink communication.

The feedback multiplexing manager 830 may transmit both the downlink acknowledgment feedback and the sidelink acknowledgment feedback to the base station via a joint transmission. In some examples, the feedback multiplexing manager 830 may multiplex the sidelink acknowledgment feedback for each of the one or more other UEs in a communication to the base station. In some examples, the feedback multiplexing manager 830 may identify that an uplink transmission resource for the sidelink acknowledgment feedback corresponds to a same uplink transmission resource for the downlink acknowledgment feedback, and where the joint transmission is responsive to the identifying.

The feedback codebook manager 835 may determine a feedback codebook for reporting acknowledgment feedback. In some cases, the joint transmission includes an acknowledgment feedback codebook for the downlink acknowledgment feedback and a sidelink acknowledgment feedback bit that is appended to the acknowledgment feedback codebook. In some cases, the sidelink acknowledgment feedback includes an acknowledgment feedback codebook having a number of bits that is determined based on the number of the one or more other UEs that are to receive the sidelink communication.

The resource scheduling manager 840 may identify resources for acknowledgment feedback. In some cases, an uplink transmission resource for the joint transmission is determined based on a grant that scheduled the downlink communication from the base station.

The groupcast configuration manager 845 may receive a groupcast configuration that indicates each of the one or more other UEs that are to receive the sidelink communication. In some cases, the groupcast configuration includes a number of UEs and an identification of each of the number of UEs that are to receive the sidelink communication. In some cases, the groupcast configuration further includes a sidelink acknowledgment feedback codebook that includes a number of bits corresponding to the number of UEs, and an order of each UE within the sidelink acknowledgment feedback codebook. In some cases, the groupcast configuration is received in radio resource control signaling from a serving base station, or is received from an application layer at the UE.

Figure 9:
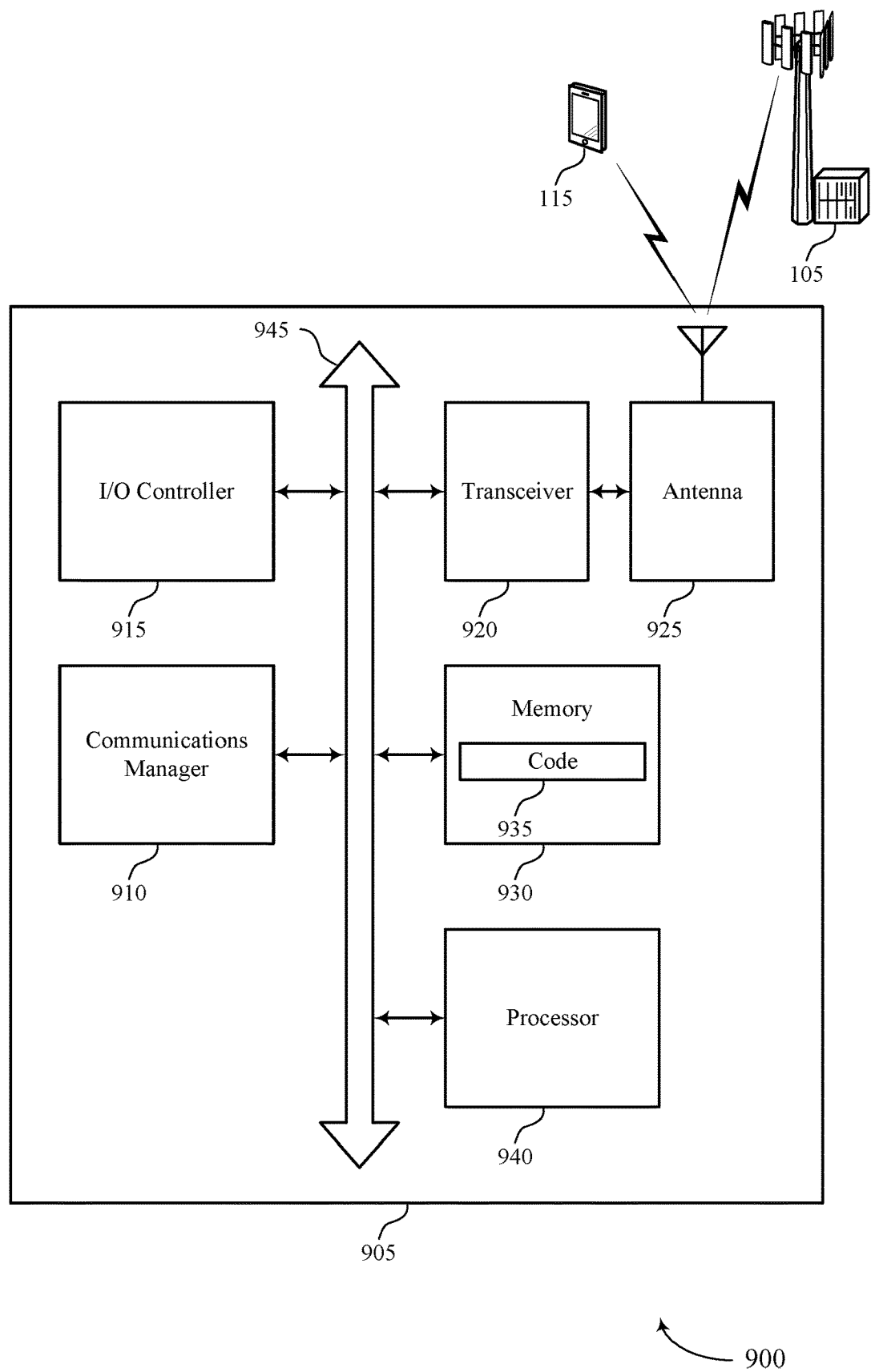
FIG. 9 shows a diagram of a system including a device that supports acknowledgment feedback techniques in sidelink wireless communications in accordance with aspects of the present disclosure.

FIG. 9 shows a diagram of a system 900 including a device 905 that supports acknowledgment feedback techniques in sidelink wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit, from a UE, a sidelink communication to one or more other UEs, determine sidelink acknowledgment feedback for reception of the sidelink communication by the one or more other UEs, receive a downlink communication from a base station, generate downlink acknowledgment feedback for reception of the downlink communication, and transmit both the downlink acknowledgment feedback and the sidelink acknowledgment feedback to the base station via a joint transmission.

The communications manager 910 may also transmit, from a UE, a sidelink communication to one or more other UEs, determine sidelink acknowledgment feedback for reception by each of the one or more other UEs of the sidelink communication, and multiplex the sidelink acknowledgment feedback for each of the one or more other UEs in a communication to the base station.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting acknowledgment feedback techniques in sidelink wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
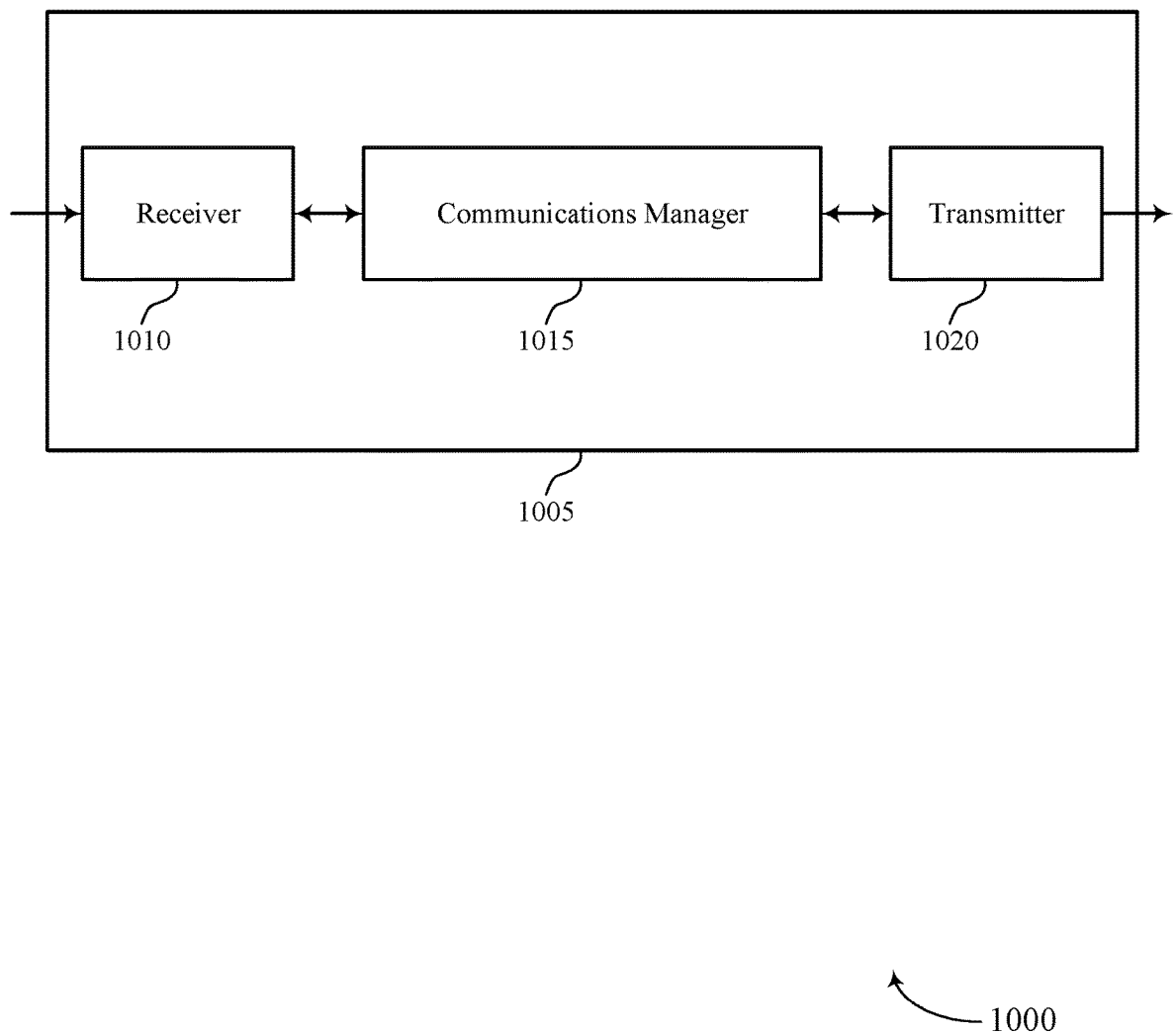
FIGS. 10 and 11 show block diagrams of devices that support acknowledgment feedback techniques in sidelink wireless communications in accordance with aspects of the present disclosure.

FIG. 10 shows a block diagram 1000 of a device 1005 that supports acknowledgment feedback techniques in sidelink wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to acknowledgment feedback techniques in sidelink wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, from a base station, a sidelink resource grant to a first UE for a sidelink communication to from the first UE to one or more other UEs, transmit a downlink transmission to the first UE, and receive both a downlink acknowledgment feedback for reception of the downlink communication and a sidelink acknowledgment feedback for reception of the sidelink communication via a joint transmission from the first UE.

The communications manager 1015 may also transmit, from a base station, a sidelink resource grant to a first UE for a sidelink communication to from the first UE to one or more other UEs, determine one or more further sidelink resource grants for retransmission of the sidelink communication based on the multiplexed sidelink acknowledgment feedback, and receive acknowledgment feedback from the first UE that includes multiplexed sidelink acknowledgment feedback for reception of the sidelink communication at each of the one or more other UEs. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
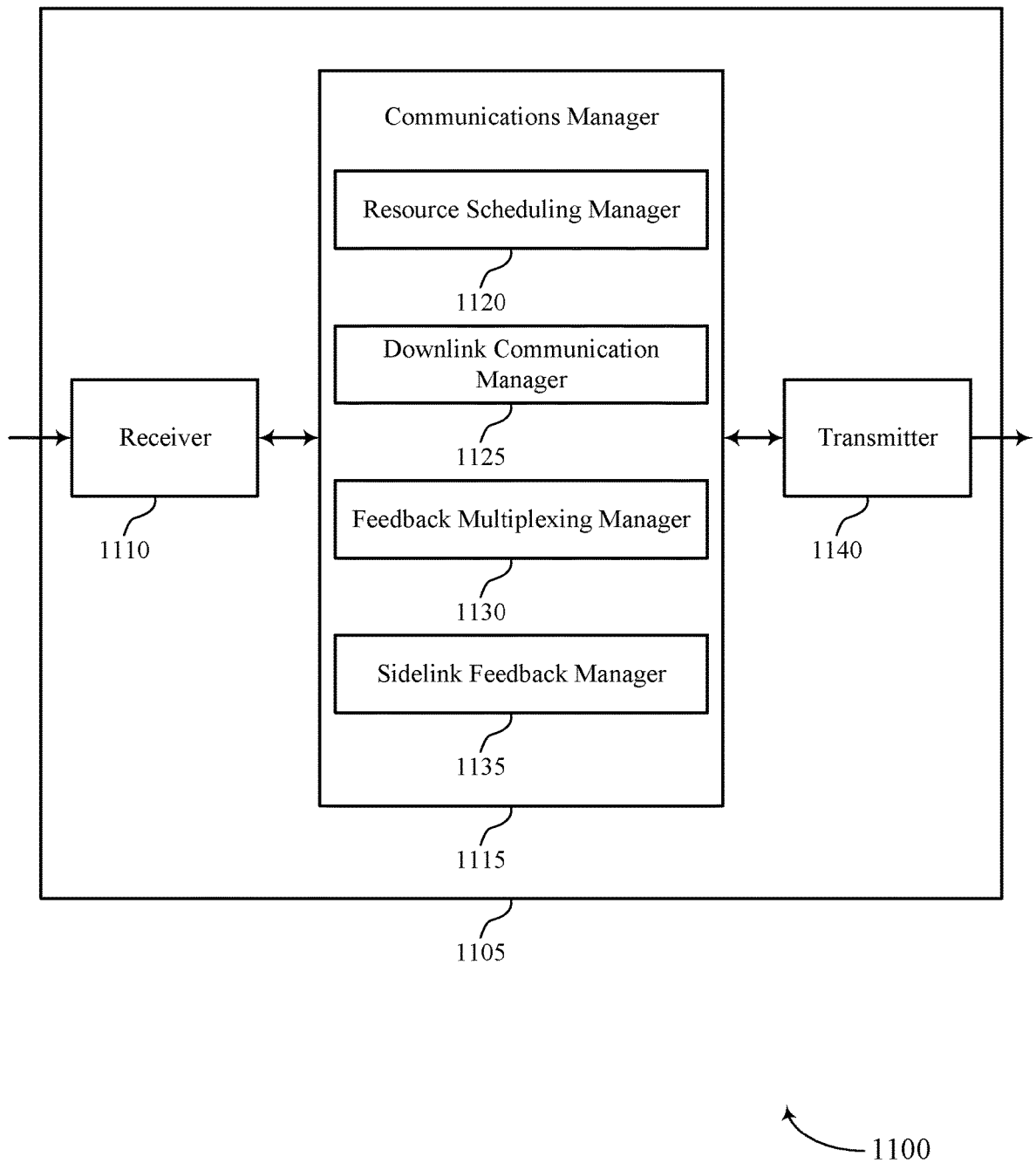

FIG. 11 shows a block diagram 1100 of a device 1105 that supports acknowledgment feedback techniques in sidelink wireless communications in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to acknowledgment feedback techniques in sidelink wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a resource scheduling manager 1120, a downlink communication manager 1125, a feedback multiplexing manager 1130, and a sidelink feedback manager 1135. The communications manager 1115 may be an example of aspects of the communications manager 1310 described herein.

The resource scheduling manager 1120 may transmit, from a base station, a sidelink resource grant to a first UE for a sidelink communication to from the first UE to one or more other UEs. The downlink communication manager 1125 may transmit a downlink transmission to the first UE. The feedback multiplexing manager 1130 may receive both a downlink acknowledgment feedback for reception of the downlink communication and a sidelink acknowledgment feedback for reception of the sidelink communication via a joint transmission from the first UE.

In some cases, the resource scheduling manager 1120 may transmit, from a base station, a sidelink resource grant to a first UE for a sidelink communication to from the first UE to one or more other UEs and determine one or more further sidelink resource grants for retransmission of the sidelink communication based on the multiplexed sidelink acknowledgment feedback. The sidelink feedback manager 1135 may receive acknowledgment feedback from the first UE that includes multiplexed sidelink acknowledgment feedback for reception of the sidelink communication at each of the one or more other UEs.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
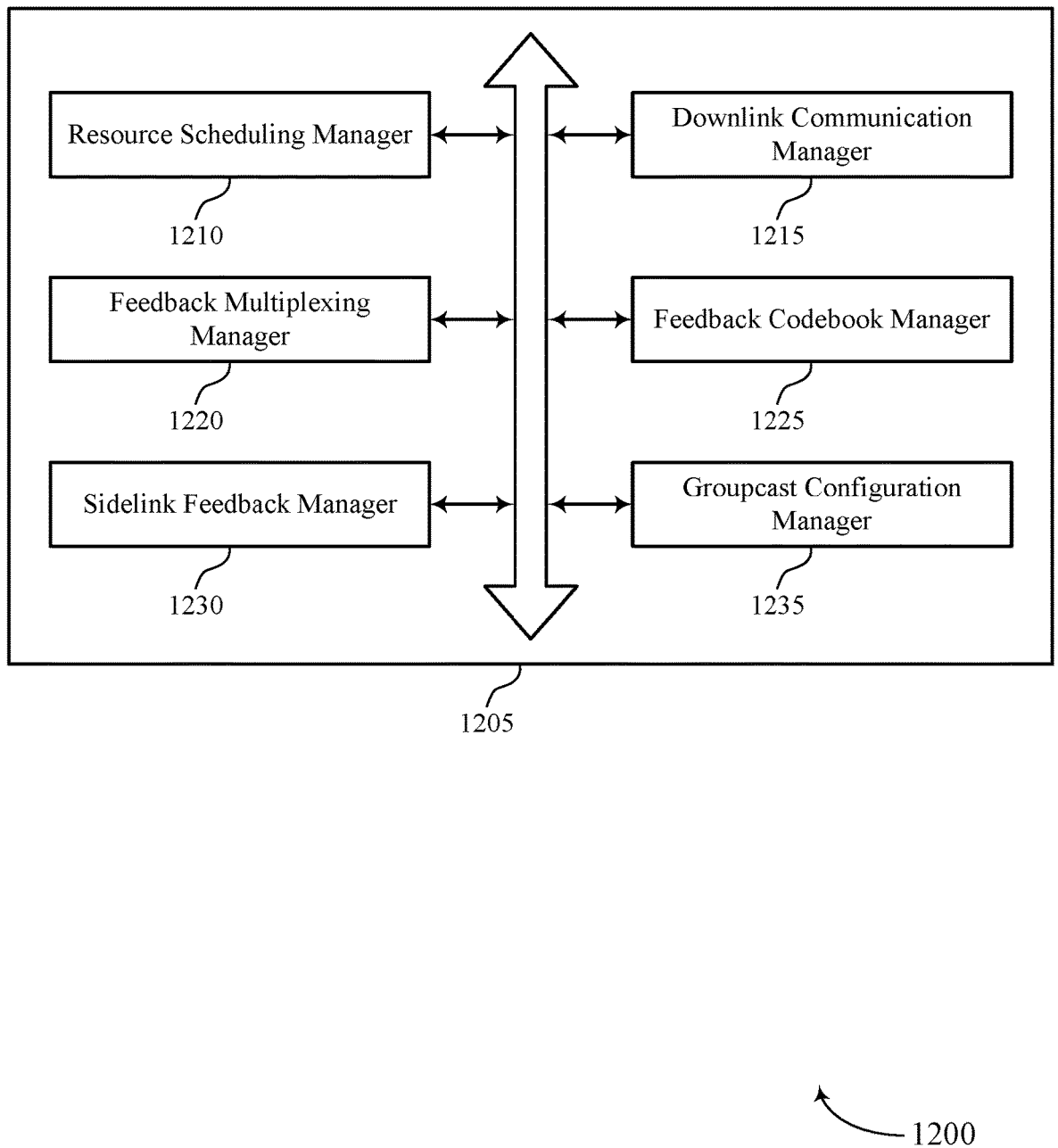
FIG. 12 shows a block diagram of a communications manager that supports acknowledgment feedback techniques in sidelink wireless communications in accordance with aspects of the present disclosure.

FIG. 12 shows a block diagram 1200 of a communications manager 1205 that supports acknowledgment feedback techniques in sidelink wireless communications in accordance with aspects of the present disclosure. The communications manager 1205 may be an example of aspects of a communications manager 1015, a communications manager 1115, or a communications manager 1310 described herein. The communications manager 1205 may include a resource scheduling manager 1210, a downlink communication manager 1215, a feedback multiplexing manager 1220, a feedback codebook manager 1225, a sidelink feedback manager 1230, and a groupcast configuration manager 1235. Each of these modules may communicate, directly or indirectly, with one another (e.g., via one or more buses).

The resource scheduling manager 1210 may transmit, from a base station, a sidelink resource grant to a first UE for a sidelink communication to from the first UE to one or more other UEs. In some examples, the resource scheduling manager 1210 may determine one or more further sidelink resource grants for retransmission of the sidelink communication based on the multiplexed sidelink acknowledgment feedback. In some examples, the resource scheduling manager 1210 may identify that an uplink transmission resource for the sidelink acknowledgment feedback corresponds to a same uplink transmission resource for the downlink acknowledgment feedback, and where the joint transmission is responsive to the identifying. In some cases, an uplink transmission resource for the joint transmission is determined based on the sidelink resource grant a downlink resource grant of the downlink transmission.

The downlink communication manager 1215 may transmit a downlink transmission to the first UE.

The feedback multiplexing manager 1220 may receive both a downlink acknowledgment feedback for reception of the downlink communication and a sidelink acknowledgment feedback for reception of the sidelink communication via a joint transmission from the first UE.

The sidelink feedback manager 1230 may receive acknowledgment feedback from the first UE that includes multiplexed sidelink acknowledgment feedback for reception of the sidelink communication at each of the one or more other UEs.

The feedback codebook manager 1225 may identify a feedback codebook for acknowledgment feedback. In some cases, the joint transmission includes an acknowledgment feedback codebook for the downlink acknowledgment feedback and a sidelink acknowledgment feedback bit that is appended to the acknowledgment feedback codebook. In some cases, the sidelink acknowledgment feedback includes an acknowledgment feedback codebook having a number of bits that is determined based on the number of the one or more other UEs that are to receive the sidelink communication.

The groupcast configuration manager 1235 may transmit, to the first UE, a groupcast configuration that indicates each of the one or more other UEs that are to receive the sidelink communication. In some cases, the groupcast configuration includes a number of UEs and an identification of each of the number of UEs that are to receive the sidelink communication. In some cases, the groupcast configuration further includes a sidelink acknowledgment feedback codebook that includes a number of bits corresponding to the number of UEs, and an order of each UE within the sidelink acknowledgment feedback codebook. In some cases, the groupcast configuration is transmitted to the first UE in radio resource control signaling.

Figure 13:
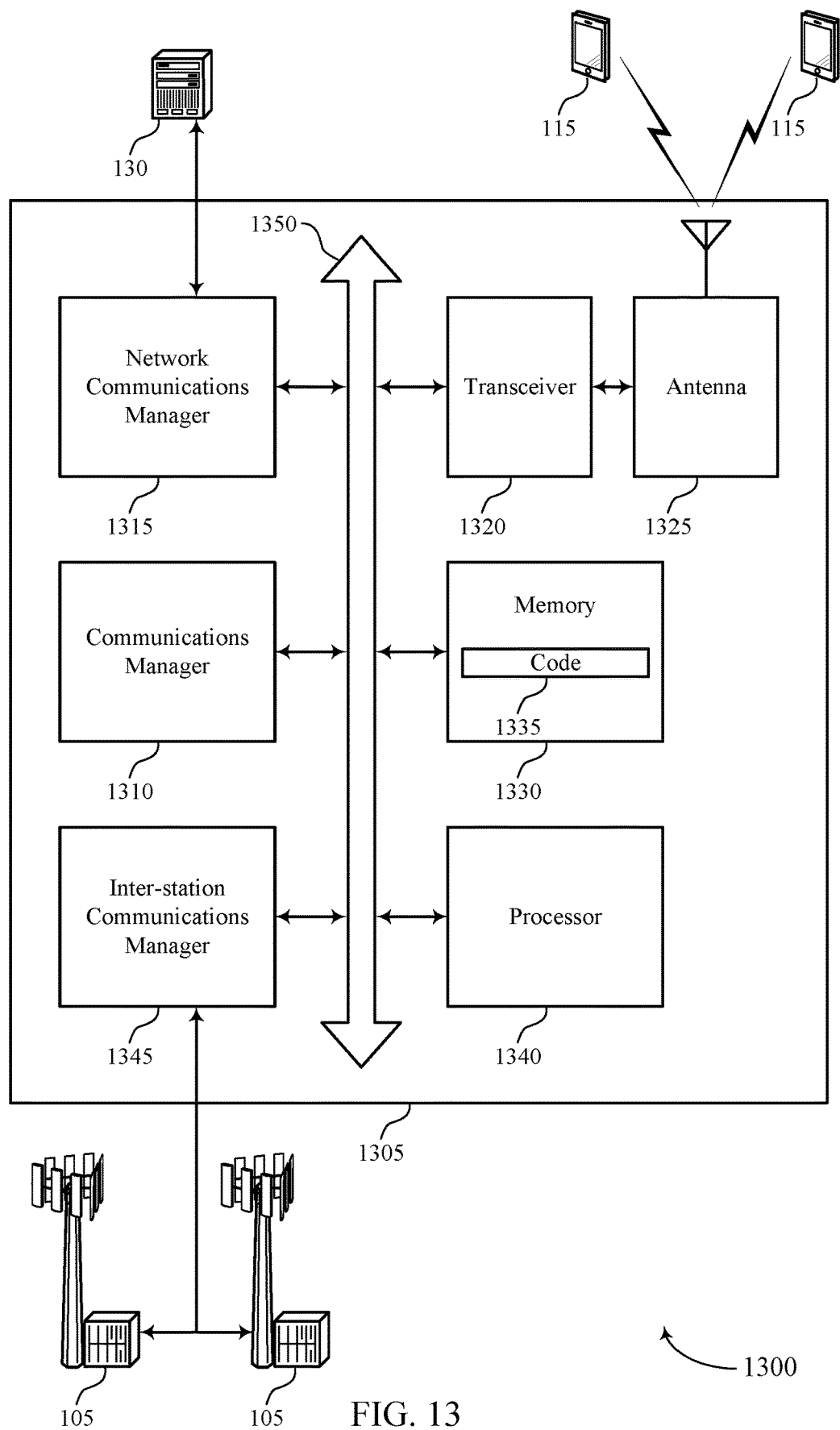
FIG. 13 shows a diagram of a system including a device that supports acknowledgment feedback techniques in sidelink wireless communications in accordance with aspects of the present disclosure.

FIG. 13 shows a diagram of a system 1300 including a device 1305 that supports acknowledgment feedback techniques in sidelink wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, from a base station, a sidelink resource grant to a first UE for a sidelink communication to from the first UE to one or more other UEs, transmit a downlink transmission to the first UE, and receive both a downlink acknowledgment feedback for reception of the downlink communication and a sidelink acknowledgment feedback for reception of the sidelink communication via a joint transmission from the first UE.

The communications manager 1310 may also transmit, from a base station, a sidelink resource grant to a first UE for a sidelink communication to from the first UE to one or more other UEs, determine one or more further sidelink resource grants for retransmission of the sidelink communication based on the multiplexed sidelink acknowledgment feedback, and receive acknowledgment feedback from the first UE that includes multiplexed sidelink acknowledgment feedback for reception of the sidelink communication at each of the one or more other UEs.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting acknowledgment feedback techniques in sidelink wireless communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
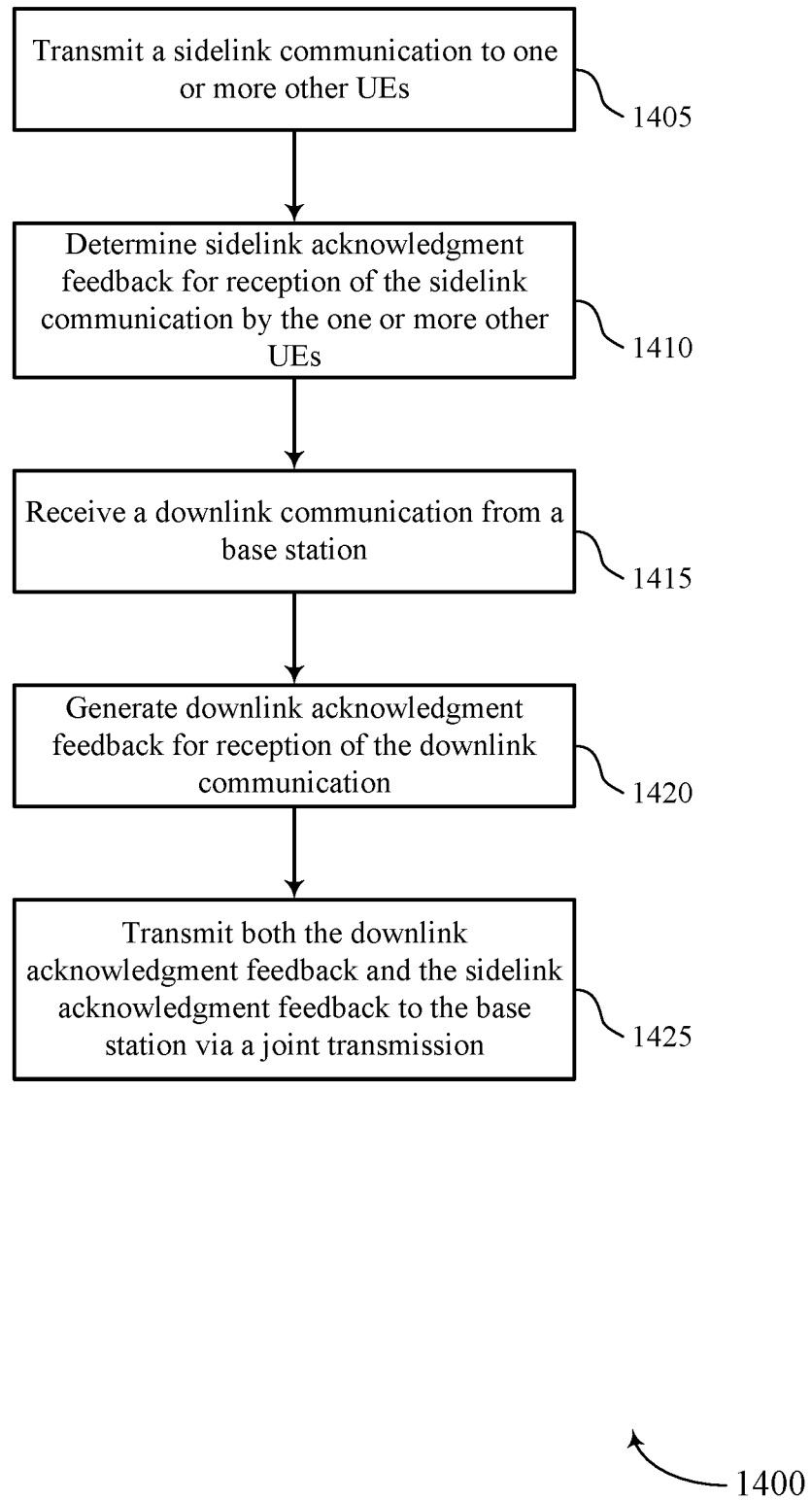
FIGS. 14 through 19 show flowcharts illustrating methods that support acknowledgment feedback techniques in sidelink wireless communications in accordance with aspects of the present disclosure.

FIG. 14 shows a flowchart illustrating a method 1400 that supports acknowledgment feedback techniques in sidelink wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit a sidelink communication to one or more other UEs. The operations of 1405 may be performed according to the methods described herein. In some examples, aspects of the operations of 1405 may be performed by a sidelink communication manager as described with reference to FIGS. 6 through 9.

At 1410, the UE may determine sidelink acknowledgment feedback for reception of the sidelink communication by the one or more other UEs. The operations of 1410 may be performed according to the methods described herein. In some examples, aspects of the operations of 1410 may be performed by a sidelink feedback manager as described with reference to FIGS. 6 through 9.

At 1415, the UE may receive a downlink communication from a base station. The operations of 1415 may be performed according to the methods described herein. In some examples, aspects of the operations of 1415 may be performed by a downlink communication manager as described with reference to FIGS. 6 through 9.

At 1420, the UE may generate downlink acknowledgment feedback for reception of the downlink communication. The operations of 1420 may be performed according to the methods described herein. In some examples, aspects of the operations of 1420 may be performed by a downlink feedback manager as described with reference to FIGS. 6 through 9.

At 1425, the UE may transmit both the downlink acknowledgment feedback and the sidelink acknowledgment feedback to the base station via a joint transmission. The operations of 1425 may be performed according to the methods described herein. In some examples, aspects of the operations of 1425 may be performed by a feedback multiplexing manager as described with reference to FIGS. 6 through 9.

Figure 15:
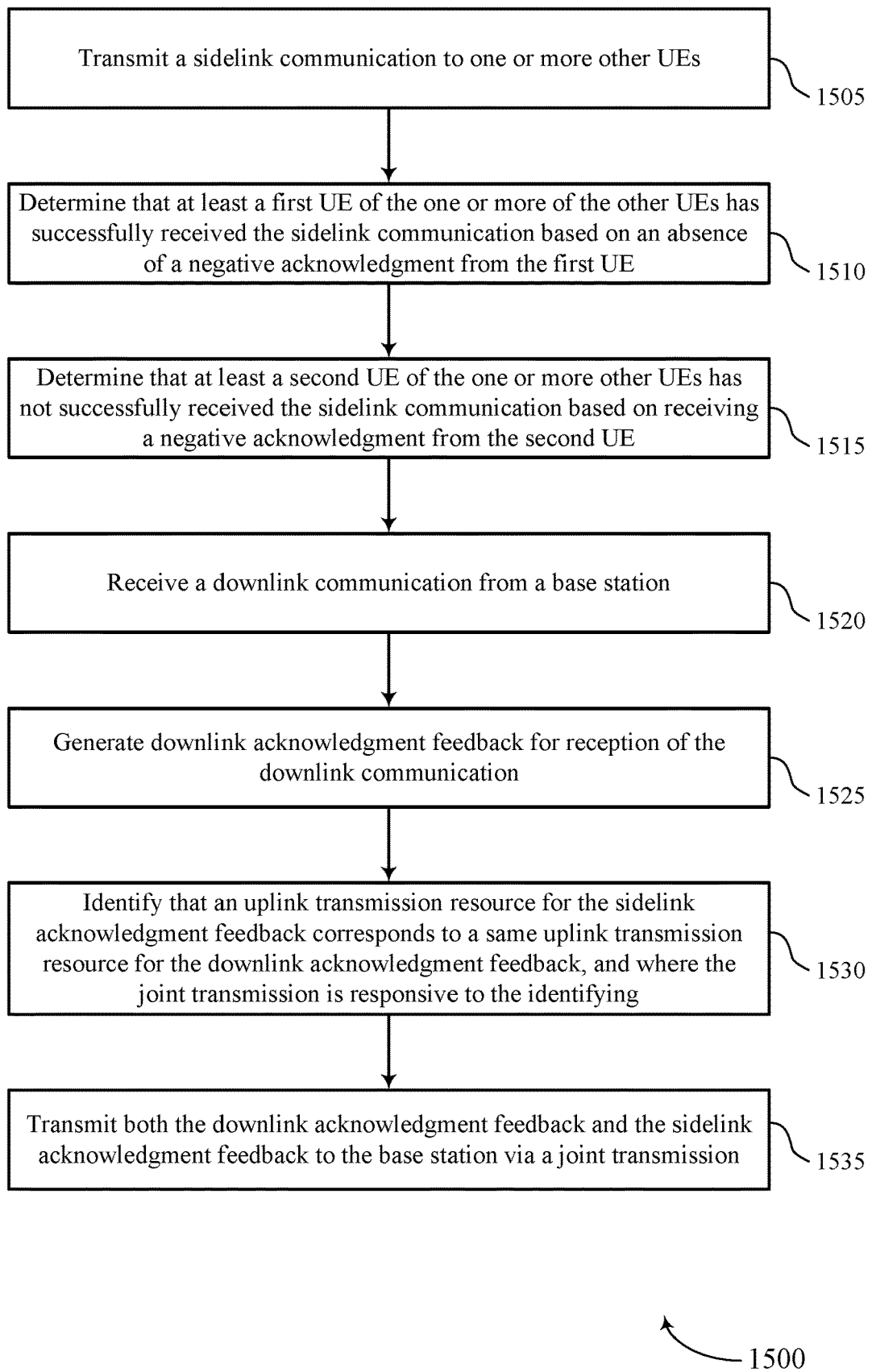

FIG. 15 shows a flowchart illustrating a method 1500 that supports acknowledgment feedback techniques in sidelink wireless communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may transmit a sidelink communication to one or more other UEs. The operations of 1505 may be performed according to the methods described herein. In some examples, aspects of the operations of 1505 may be performed by a sidelink communication manager as described with reference to FIGS. 6 through 9.

At 1510, the UE may determine that at least a first UE of the one or more of the other UEs has successfully received the sidelink communication based on an absence of a negative acknowledgment from the first UE. The operations of 1510 may be performed according to the methods described herein. In some examples, aspects of the operations of 1510 may be performed by a sidelink feedback manager as described with reference to FIGS. 6 through 9.

At 1515, the UE may determine that at least a second UE of the one or more other UEs has not successfully received the sidelink communication based on receiving a negative acknowledgment from the second UE. The operations of 1515 may be performed according to the methods described herein. In some examples, aspects of the operations of 1515 may be performed by a sidelink feedback manager as described with reference to FIGS. 6 through 9.

At 1520, the UE may receive a downlink communication from a base station. The operations of 1520 may be performed according to the methods described herein. In some examples, aspects of the operations of 1520 may be performed by a downlink communication manager as described with reference to FIGS. 6 through 9.

At 1525, the UE may generate downlink acknowledgment feedback for reception of the downlink communication. The operations of 1525 may be performed according to the methods described herein. In some examples, aspects of the operations of 1525 may be performed by a downlink feedback manager as described with reference to FIGS. 6 through 9.

At 1530, the UE may identify that an uplink transmission resource for the sidelink acknowledgment feedback corresponds to a same uplink transmission resource for the downlink acknowledgment feedback, and where the joint transmission is responsive to the identifying. The operations of 1530 may be performed according to the methods described herein. In some examples, aspects of the operations of 1530 may be performed by a feedback multiplexing manager as described with reference to FIGS. 6 through 9.

At 1535, the UE may transmit both the downlink acknowledgment feedback and the sidelink acknowledgment feedback to the base station via a joint transmission. The operations of 1535 may be performed according to the methods described herein. In some examples, aspects of the operations of 1535 may be performed by a feedback multiplexing manager as described with reference to FIGS. 6 through 9. In some cases, the joint transmission includes an acknowledgment feedback codebook for the downlink acknowledgment feedback and a sidelink acknowledgment feedback bit that is appended to the acknowledgment feedback codebook.

Figure 16:
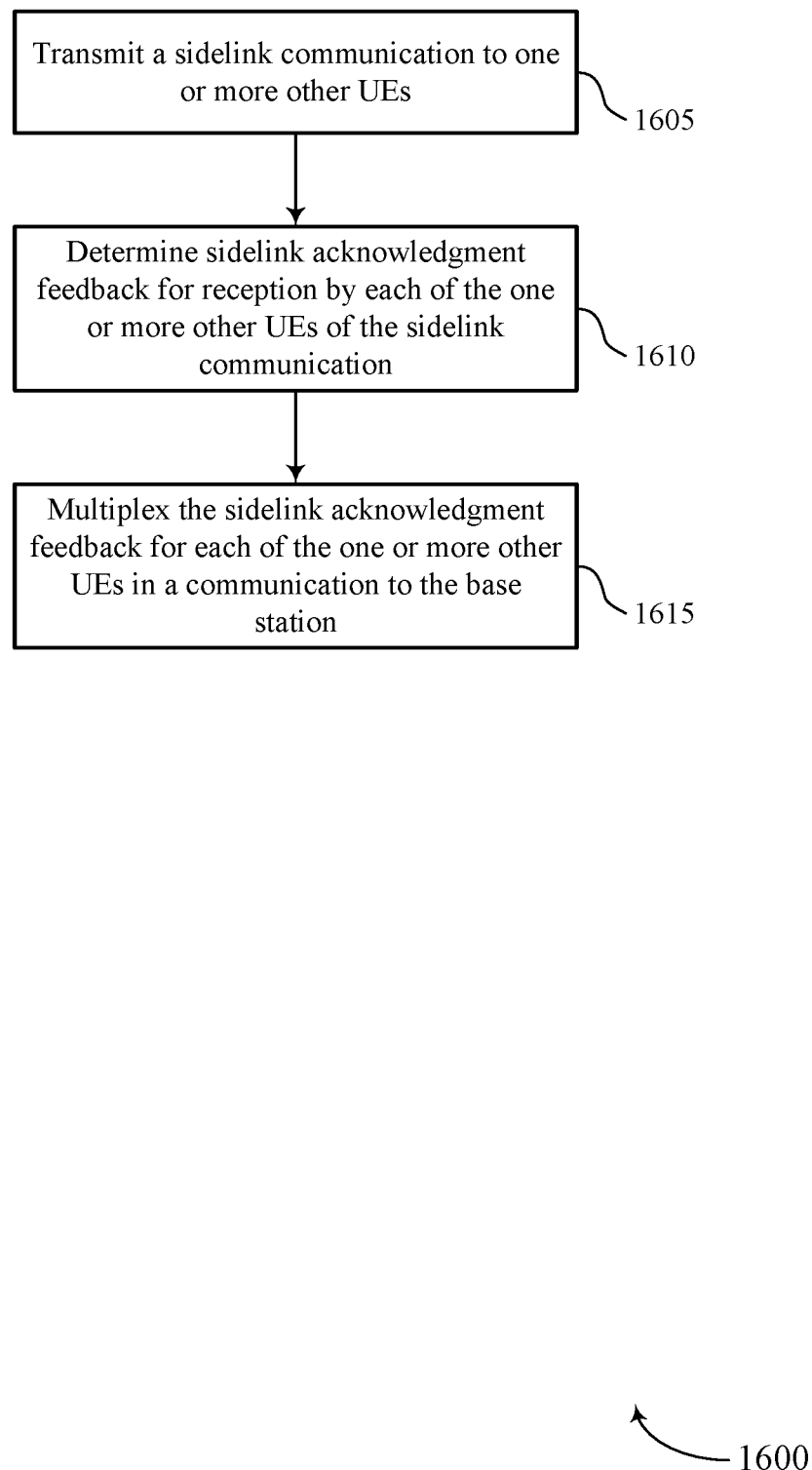

FIG. 16 shows a flowchart illustrating a method 1600 that supports acknowledgment feedback techniques in sidelink wireless communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may transmit a sidelink communication to one or more other UEs. The operations of 1605 may be performed according to the methods described herein. In some examples, aspects of the operations of 1605 may be performed by a sidelink communication manager as described with reference to FIGS. 6 through 9.

At 1610, the UE may determine sidelink acknowledgment feedback for reception by each of the one or more other UEs of the sidelink communication. The operations of 1610 may be performed according to the methods described herein. In some examples, aspects of the operations of 1610 may be performed by a sidelink feedback manager as described with reference to FIGS. 6 through 9.

At 1615, the UE may multiplex the sidelink acknowledgment feedback for each of the one or more other UEs in a communication to the base station. The operations of 1615 may be performed according to the methods described herein. In some examples, aspects of the operations of 1615 may be performed by a feedback multiplexing manager as described with reference to FIGS. 6 through 9.

Figure 17:
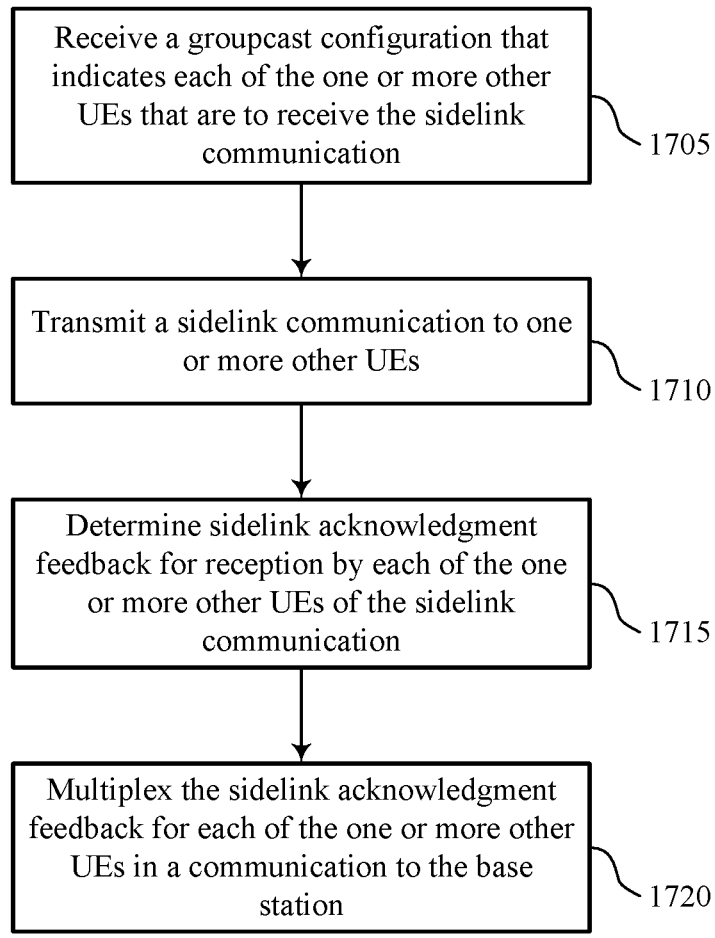

FIG. 17 shows a flowchart illustrating a method 1700 that supports acknowledgment feedback techniques in sidelink wireless communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive a groupcast configuration that indicates each of the one or more other UEs that are to receive the sidelink communication. The operations of 1705 may be performed according to the methods described herein. In some examples, aspects of the operations of 1705 may be performed by a groupcast configuration manager as described with reference to FIGS. 6 through 9.

At 1710, the UE may transmit a sidelink communication to one or more other UEs. The operations of 1710 may be performed according to the methods described herein. In some examples, aspects of the operations of 1710 may be performed by a sidelink communication manager as described with reference to FIGS. 6 through 9.

At 1715, the UE may determine sidelink acknowledgment feedback for reception by each of the one or more other UEs of the sidelink communication. The operations of 1715 may be performed according to the methods described herein. In some examples, aspects of the operations of 1715 may be performed by a sidelink feedback manager as described with reference to FIGS. 6 through 9.

At 1720, the UE may multiplex the sidelink acknowledgment feedback for each of the one or more other UEs in a communication to the base station. The operations of 1720 may be performed according to the methods described herein. In some examples, aspects of the operations of 1720 may be performed by a feedback multiplexing manager as described with reference to FIGS. 6 through 9.

Figure 18:
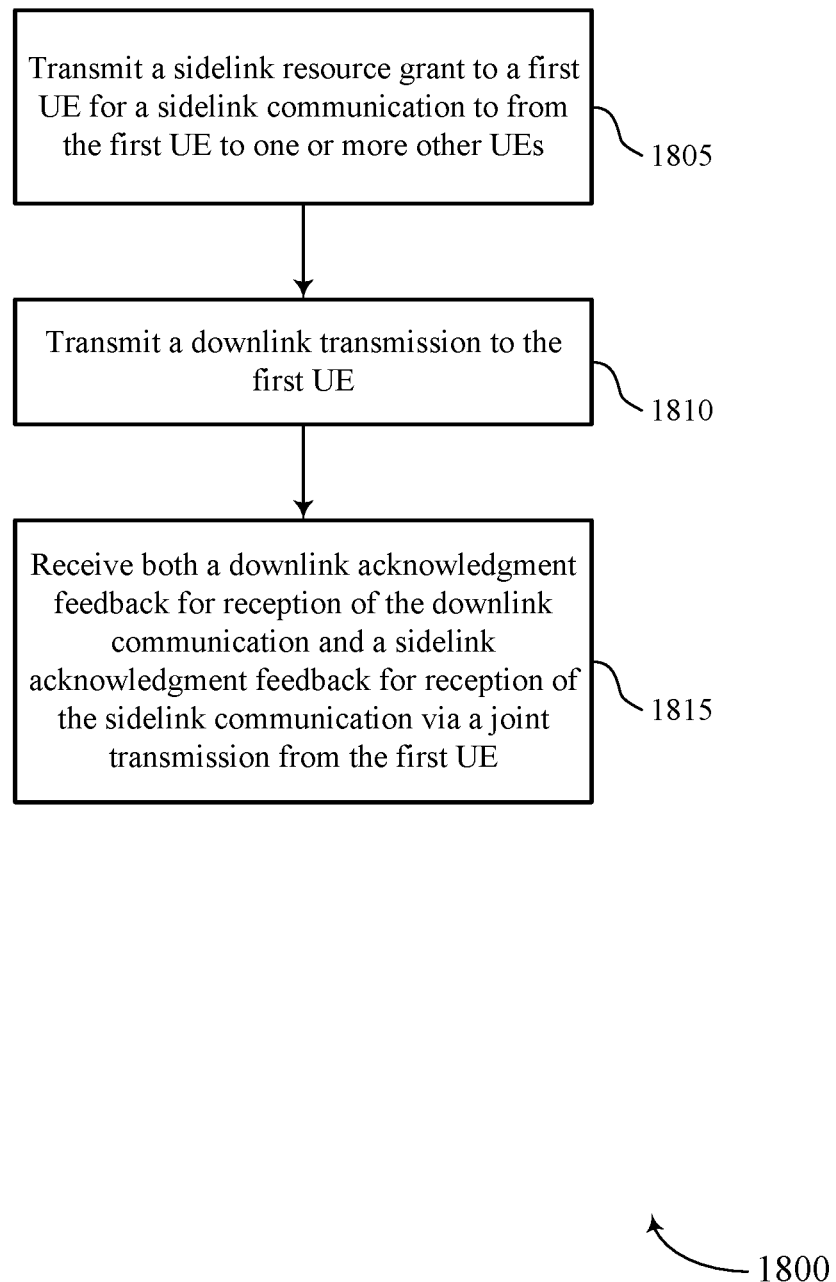

FIG. 18 shows a flowchart illustrating a method 1800 that supports acknowledgment feedback techniques in sidelink wireless communications in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit a sidelink resource grant to a first UE for a sidelink communication to from the first UE to one or more other UEs. The operations of 1805 may be performed according to the methods described herein. In some examples, aspects of the operations of 1805 may be performed by a resource scheduling manager as described with reference to FIGS. 10 through 13.

At 1810, the base station may transmit a downlink transmission to the first UE. The operations of 1810 may be performed according to the methods described herein. In some examples, aspects of the operations of 1810 may be performed by a downlink communication manager as described with reference to FIGS. 10 through 13.

At 1815, the base station may receive both a downlink acknowledgment feedback for reception of the downlink communication and a sidelink acknowledgment feedback for reception of the sidelink communication via a joint transmission from the first UE. The operations of 1815 may be performed according to the methods described herein. In some examples, aspects of the operations of 1815 may be performed by a feedback multiplexing manager as described with reference to FIGS. 10 through 13.

Figure 19:
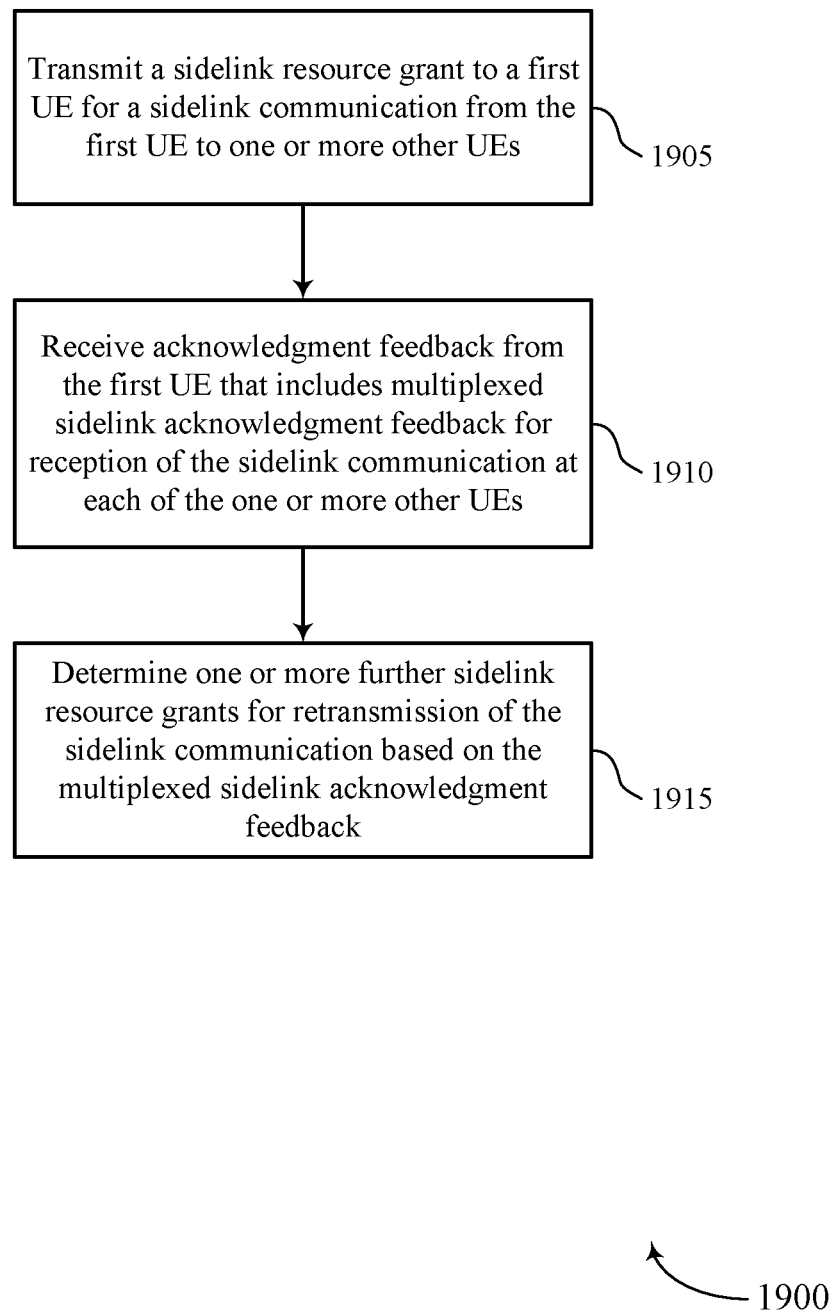

FIG. 19 shows a flowchart illustrating a method 1900 that supports acknowledgment feedback techniques in sidelink wireless communications in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit a sidelink resource grant to a first UE for a sidelink communication to from the first UE to one or more other UEs. The operations of 1905 may be performed according to the methods described herein. In some examples, aspects of the operations of 1905 may be performed by a resource scheduling manager as described with reference to FIGS. 10 through 13.

At 1910, the base station may receive acknowledgment feedback from the first UE that includes multiplexed sidelink acknowledgment feedback for reception of the sidelink communication at each of the one or more other UEs. The operations of 1910 may be performed according to the methods described herein. In some examples, aspects of the operations of 1910 may be performed by a sidelink feedback manager as described with reference to FIGS. 10 through 13.

At 1915, the base station may determine one or more further sidelink resource grants for retransmission of the sidelink communication based on the multiplexed sidelink acknowledgment feedback. The operations of 1915 may be performed according to the methods described herein. In some examples, aspects of the operations of 1915 may be performed by a resource scheduling manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

SUMMARY OF ASPECTS

The following provides an overview of aspects of the present disclosure:

Aspect 1: A method for wireless communications, comprising: transmitting, from a UE, a sidelink communication to one or more other UEs; determining sidelink acknowledgment feedback for reception of the sidelink communication by the one or more other UEs; receiving a downlink communication from a base station; generating downlink acknowledgment feedback for reception of the downlink communication; and transmitting both the downlink acknowledgment feedback and the sidelink acknowledgment feedback to the base station via a joint transmission.

Aspect 2: The method of aspect 1, further comprising: identifying that an uplink transmission resource for the sidelink acknowledgment feedback corresponds to a same uplink transmission resource for the downlink acknowledgment feedback, and wherein the joint transmission is responsive to the identifying.

Aspect 3: The method of aspect 1, further comprising: identifying that an uplink transmission resource for the sidelink acknowledgment feedback collides with an uplink transmission resource for the downlink acknowledgment feedback, and wherein the joint transmission is responsive to the identifying.

Aspect 4: The method of any of aspects 1 through 3, wherein the joint transmission comprises an acknowledgment feedback codebook for the downlink acknowledgment feedback and a sidelink acknowledgment feedback bit that is appended to the acknowledgment feedback codebook.

Aspect 5: The method of aspect 4, wherein the determining the sidelink acknowledgment feedback comprises: determining that at least a first UE of the one or more of the other UEs has successfully received the sidelink communication based on an absence of a negative acknowledgment from the first UE; and determining that at least a second UE of the one or more other UEs has not successfully received the sidelink communication based on receiving a negative acknowledgment from the second UE.

Aspect 6: The method of aspect 5, further comprising: setting the sidelink acknowledgment feedback bit to indicate a negative acknowledgment based at least in part on the negative acknowledgment received from the second UE.

Aspect 7: The method of aspect 5, further comprising: setting the sidelink acknowledgment feedback bit to indicate an acknowledgment of reception of the sidelink communication based at least in part on an absence of a negative acknowledgment being received from any of the one or more other UEs.

Aspect 8: The method of any of aspects 1 through 7, wherein an uplink transmission resource for the joint transmission is determined based at least in part on a grant that scheduled the downlink communication from the base station.

Aspect 9: A method for wireless communications, comprising: transmitting, from a UE, a sidelink communication to one or more other UEs; determining sidelink acknowledgment feedback for reception by each of the one or more other UEs of the sidelink communication; and multiplexing the sidelink acknowledgment feedback for each of the one or more other UEs in a communication to the base station.

Aspect 10: The method of aspect 9, wherein the sidelink acknowledgment feedback comprises an acknowledgment feedback codebook having a number of bits that is determined based at least in part on a number of the one or more other UEs that are to receive the sidelink communication.

Aspect 11: The method of any of aspects 9 through 10, further comprising: receiving a groupcast configuration that indicates each of the one or more other UEs that are to receive the sidelink communication.

Aspect 12: The method of aspect 11, wherein the groupcast configuration comprises a number of UEs and an identification of each of the number of UEs that are to receive the sidelink communication.

Aspect 13: The method of aspect 12, wherein the groupcast configuration further comprises a sidelink acknowledgment feedback codebook that includes a number of bits corresponding to the number of UEs, and an order of each UE within the sidelink acknowledgment feedback codebook.

Aspect 14: The method of any of aspects 11 through 13, wherein the groupcast configuration is received in radio resource control signaling from a serving base station, or is received from an application layer at the UE.

Aspect 15: A method for wireless communications, comprising: transmitting, from a base station, a sidelink resource grant to a first UE for a sidelink communication from the first UE to one or more other UEs; transmitting a downlink transmission to the first UE; and receiving both a downlink acknowledgment feedback for reception of the downlink communication and a sidelink acknowledgment feedback for reception of the sidelink communication via a joint transmission from the first UE.

Aspect 16: The method of aspect 15, further comprising: identifying that an uplink transmission resource for the sidelink acknowledgment feedback corresponds to a same uplink transmission resource for the downlink acknowledgment feedback, and wherein the joint transmission is responsive to the identifying.

Aspect 17: The method of any of aspects 15 through 16, wherein the joint transmission comprises an acknowledgment feedback codebook for the downlink acknowledgment feedback and a sidelink acknowledgment feedback bit that is appended to the acknowledgment feedback codebook.

Aspect 18: The method of any of aspects 15 through 17, wherein an uplink transmission resource for the joint transmission is determined based at least in part on the sidelink resource grant a downlink resource grant of the downlink transmission.

Aspect 19: A method for wireless communications, comprising: transmitting, from a base station, a sidelink resource grant to a first UE for a sidelink communication from the first UE to one or more other UEs; receiving acknowledgment feedback from the first UE that includes multiplexed sidelink acknowledgment feedback for reception of the sidelink communication at each of the one or more other UEs; and determining one or more further sidelink resource grants for retransmission of the sidelink communication based at least in part on the multiplexed sidelink acknowledgment feedback.

Aspect 20: The method of aspect 19, wherein the sidelink acknowledgment feedback comprises an acknowledgment feedback codebook having a number of bits that is determined based at least in part on the number of the one or more other UEs that are to receive the sidelink communication.

Aspect 21: The method of any of aspects 19 through 20, further comprising: transmitting, to the first UE, a groupcast configuration that indicates each of the one or more other UEs that are to receive the sidelink communication.

Aspect 22: The method of aspect 21, wherein the groupcast configuration comprises a number of UEs and an identification of each of the number of UEs that are to receive the sidelink communication.

Aspect 23: The method of aspect 22, wherein the groupcast configuration further comprises a sidelink acknowledgment feedback codebook that includes a number of bits corresponding to the number of UEs, and an order of each UE within the sidelink acknowledgment feedback codebook.

Aspect 24: The method of any of aspects 21 through 23, wherein the groupcast configuration is transmitted to the first UE in radio resource control signaling.

Aspect 25: An apparatus for wireless communications comprising a processor and memory coupled to the processor, the processor and memory configured to perform a method of any of aspects 1 through 8.

Aspect 26: An apparatus for wireless communications comprising at least one means for performing a method of any of aspects 1 through 8.

Aspect 27: A non-transitory computer-readable medium storing code for wireless communications the code comprising instructions executable by a processor to perform a method of any of aspects 1 through 8.

Aspect 28: An apparatus for wireless communications comprising a processor and memory coupled to the processor, the processor and memory configured to perform a method of any of aspects 9 through 14.

Aspect 29: An apparatus for wireless communications comprising at least one means for performing a method of any of aspects 9 through 14.

Aspect 30: A non-transitory computer-readable medium storing code for wireless communications the code comprising instructions executable by a processor to perform a method of any of aspects 9 through 14.

Aspect 31: An apparatus for wireless communications comprising a processor and memory coupled to the processor, the processor and memory configured to perform a method of any of aspects 15 through 18.

Aspect 32: An apparatus for wireless communications comprising at least one means for performing a method of any of aspects 15 through 18.

Aspect 33: A non-transitory computer-readable medium storing code for wireless communications the code comprising instructions executable by a processor to perform a method of any of aspects 15 through 18.

Aspect 34: An apparatus for wireless communications comprising a processor and memory coupled to the processor, the processor and memory configured to perform a method of any of aspects 19 through 24.

Aspect 35: An apparatus for wireless communications comprising at least one means for performing a method of any of aspects 19 through 24.

Aspect 36: A non-transitory computer-readable medium storing code for wireless communications the code comprising instructions executable by a processor to perform a method of any of aspects 19 through 24.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   transmitting, from a user equipment (UE), a sidelink communication to a plurality of other UEs;

determining sidelink acknowledgment feedback for reception of the sidelink communication by the plurality of other UEs;
receiving a downlink communication from a network device;
generating downlink acknowledgment feedback for reception of the downlink communication; and
transmitting both the downlink acknowledgment feedback and the sidelink acknowledgment feedback to the network device via a joint transmission, wherein the joint transmission comprises an acknowledgment feedback codebook for the downlink acknowledgment feedback and a sidelink acknowledgment feedback bit, and wherein the sidelink acknowledgment feedback bit indicates an acknowledgment of reception of the sidelink communication based at least in part on an absence of a negative acknowledgment being received from any of the plurality of other UEs.

2. The method of claim 1, further comprising:
identifying that an uplink transmission resource for the sidelink acknowledgment feedback corresponds to a same uplink transmission resource for the downlink acknowledgment feedback, and wherein the joint transmission is responsive to the identifying.

3. The method of claim 1, further comprising:
identifying that an uplink transmission resource for the sidelink acknowledgment feedback collides with an uplink transmission resource for the downlink acknowledgment feedback, and wherein the joint transmission is responsive to the identifying.

4. The method of claim 1, wherein the sidelink acknowledgment feedback bit is appended to the acknowledgment feedback codebook.

5. The method of claim 4, wherein the determining the sidelink acknowledgment feedback comprises:
determining that at least a first UE of the plurality of other UEs has successfully received the sidelink communication based on an absence of a negative acknowledgment from the first UE.

6. The method of claim 1, wherein an uplink transmission resource for the joint transmission is determined based at least in part on a grant that scheduled the downlink communication from the network device.

7. A method for wireless communications at a user equipment (UE), comprising:
identifying a plurality of other UEs that are to receive a sidelink communication, a quantity of the plurality of other UEs, and an identification of each of the plurality of other UEs;
transmitting, from the UE, the sidelink communication to the plurality of other UEs;
determining sidelink acknowledgment feedback for reception by each of the plurality of other UEs of the sidelink communication; and
multiplexing the sidelink acknowledgment feedback for each of the plurality of other UEs in a communication to a network device, wherein the sidelink acknowledgment feedback comprises an acknowledgment feedback codebook having a quantity of bits that is determined based at least in part on the quantity of the plurality of other UEs that are to receive the sidelink communication and the identification of each of the plurality of other UEs, and wherein each bit of the quantity of bits in the acknowledgment feedback codebook corresponds to a respective identification of a respective UE of the plurality of other UEs.

8. The method of claim 7, further comprising:
receiving a groupcast configuration that indicates each of the plurality of other UEs that are to receive the sidelink communication, wherein identifying the plurality of other UEs is based at least in part on receiving the groupcast configuration.

9. The method of claim 8, wherein the groupcast configuration indicates the quantity of the plurality of other UEs and the identification of each of plurality of other UEs that are to receive the sidelink communication, wherein identifying the quantity of the plurality of other UEs and the identification of each of the plurality of other UEs is based at least in part on receiving the groupcast configuration.

10. The method of claim 9, wherein the groupcast configuration further comprises the acknowledgment feedback codebook that includes the quantity of bits corresponding to the quantity of the plurality of other UEs, and an order of each UE within the acknowledgment feedback codebook.

11. The method of claim 8, wherein the groupcast configuration is received in radio resource control signaling from a serving base station, or is received from an application layer at the UE.

12. An apparatus for wireless communications, comprising:
a processor,
memory coupled with the processor; and
instructions stored in the memory and executable by the processor to cause the apparatus to:
transmit, from a user equipment (UE), a sidelink communication to a plurality of other UEs;
determine sidelink acknowledgment feedback for reception of the sidelink communication by the plurality of other UEs;
receive a downlink communication from a network device;
generate downlink acknowledgment feedback for reception of the downlink communication; and
transmit both the downlink acknowledgment feedback and the sidelink acknowledgment feedback to the network device via a joint transmission, wherein the joint transmission comprises an acknowledgment feedback codebook for the downlink acknowledgment feedback and a sidelink acknowledgment feedback bit, and wherein the sidelink acknowledgment feedback bit indicates an acknowledgment of reception of the sidelink communication based at least in part on an absence of a negative acknowledgment being received from any of the plurality of other UEs.

13. The apparatus of claim 12, wherein the instructions are further executable by the processor to cause the apparatus to:
identify that an uplink transmission resource for the sidelink acknowledgment feedback corresponds to a same uplink transmission resource for the downlink acknowledgment feedback, and wherein the joint transmission is responsive to the identifying.

14. The apparatus of claim 12, wherein the instructions are further executable by the processor to cause the apparatus to:
identify that an uplink transmission resource for the sidelink acknowledgment feedback collides with an uplink transmission resource for the downlink acknowledgment feedback, and wherein the joint transmission is responsive to the identifying.

15. The apparatus of claim 12, wherein the sidelink acknowledgment feedback bit is appended to the acknowledgment feedback codebook.

16. The apparatus of claim 12, wherein the instructions to determine the sidelink acknowledgment feedback are executable by the processor to:
determine that at least a first UE of the plurality of other UEs has successfully received the sidelink communication based on an absence of a negative acknowledgment from the first UE.

17. The apparatus of claim 12, wherein an uplink transmission resource for the joint transmission is determined based at least in part on a grant that scheduled the downlink communication from the network device.

18. An apparatus for wireless communications at a user equipment (UE), comprising:
a processor,
memory coupled with the processor; and
instructions stored in the memory and executable by the processor to cause the apparatus to:
identify a plurality of other UEs that are to receive a sidelink communication, a quantity of the plurality of other UEs, and an identification of each of the plurality of other UEs;
transmit, from the UE, the sidelink communication to the plurality of other UEs;
determine sidelink acknowledgment feedback for reception by each of the plurality of other UEs of the sidelink communication; and
multiplex the sidelink acknowledgment feedback for each of the plurality of other UEs in a communication to a network device, wherein the sidelink acknowledgment feedback comprises an acknowledgment feedback codebook having a quantity of bits that is determined based at least in part on the quantity of the plurality of other UEs that are to receive the sidelink communication and the identification of each of the plurality of other UEs, and wherein each bit of the quantity of bits in the acknowledgment feedback codebook corresponds to a respective identification of a respective UE of the plurality of other UEs.

19. The apparatus of claim 18, wherein the instructions are further executable by the processor to cause the apparatus to:
receive a groupcast configuration that indicates each of the plurality of other UEs that are to receive the sidelink communication, wherein identifying the plurality of other UEs is based at least in part on receiving the groupcast configuration.

20. The apparatus of claim 19, wherein the groupcast configuration indicates the quantity of the plurality of other UEs and the identification of each of the plurality of other UEs that are to receive the sidelink communication, wherein identifying the plurality of other UEs and the identification of each of the plurality of other UEs is based at least in part on receiving the groupcast configuration.

21. The apparatus of claim 20, wherein the groupcast configuration further comprises the acknowledgment feedback codebook that includes the quantity of bits corresponding to the quantity of the plurality of other UEs, and an order of each UE within the acknowledgment feedback codebook.

22. The apparatus of claim 19, wherein the groupcast configuration is received in radio resource control signaling from a serving base station, or is received from an application layer at the UE.

* * * * *